(12) United States Patent
Nagano et al.

(10) Patent No.: US 8,656,302 B2
(45) Date of Patent: Feb. 18, 2014

(54) DISPLAY SYSTEM, NETWORK INTERACTIVE DISPLAY DEVICE, TERMINAL, AND CONTROL PROGRAM

(75) Inventors: Miki Nagano, Suwa (JP); Norihiro Yoshikuni, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 689 days.

(21) Appl. No.: 12/588,714

(22) Filed: Oct. 26, 2009

(65) Prior Publication Data

US 2010/0095241 A1  Apr. 15, 2010

Related U.S. Application Data

(63) Continuation of application No. 10/623,518, filed on Jul. 22, 2003, now abandoned.

(30) Foreign Application Priority Data

Jul. 23, 2002 (JP) ................................. 2002-214405
Jul. 23, 2002 (JP) ................................. 2002-214406

(51) Int. Cl.
 *G06F 3/048* (2013.01)

(52) U.S. Cl.
 USPC ............ 715/781; 715/733; 715/734; 345/530

(58) Field of Classification Search
 USPC ................... 715/781, 733, 734, 753; 345/530
 See application file for complete search history.

(56) References Cited

U.S. PATENT DOCUMENTS

| | | | | |
|---|---|---|---|---|
| 5,408,247 A | * | 4/1995 | Enomoto et al. | 345/100 |
| 5,617,135 A | * | 4/1997 | Noda et al. | 348/14.12 |
| 5,826,035 A | * | 10/1998 | Hamada et al. | 709/247 |
| 5,929,850 A | * | 7/1999 | Broadwin et al. | 725/110 |
| 6,008,803 A | * | 12/1999 | Rowe et al. | 348/E5.105 |
| 6,008,809 A | * | 12/1999 | Brooks | 715/792 |
| 6,333,750 B1 | * | 12/2001 | Odryna et al. | 345/629 |
| 6,384,868 B1 | * | 5/2002 | Oguma | 348/564 |
| 6,388,654 B1 | | 5/2002 | Platzker et al. | |
| 6,473,088 B1 | * | 10/2002 | Matsumoto et al. | 345/530 |
| 6,522,352 B1 | * | 2/2003 | Strandwitz et al. | 348/211.2 |
| 6,600,500 B1 | * | 7/2003 | Yamamoto | 715/795 |
| 6,830,340 B2 | * | 12/2004 | Olson et al. | 353/30 |
| 6,885,406 B2 | * | 4/2005 | Yui et al. | 348/564 |
| 6,940,528 B2 | * | 9/2005 | Fukui et al. | 345/634 |
| 6,977,661 B1 | * | 12/2005 | Stokes et al. | 345/589 |
| 7,091,994 B2 | * | 8/2006 | Hayashi et al. | 345/629 |
| 2001/0017630 A1 | * | 8/2001 | Sakashita et al. | 345/635 |
| 2001/0017890 A1 | * | 8/2001 | Rhee | 375/240.16 |
| 2001/0040684 A1 | * | 11/2001 | Takahashi | 358/1.2 |
| 2001/0050679 A1 | * | 12/2001 | Shigeta | 345/204 |
| 2002/0067433 A1 | * | 6/2002 | Yui et al. | 348/588 |

(Continued)

FOREIGN PATENT DOCUMENTS

| | | |
|---|---|---|
| EP | 1 094 398 A1 | 4/2001 |
| GB | 2 319 135 A | 5/1998 |
| JP | A-2001-356753 | 12/2001 |

*Primary Examiner* — Tuyetlien Tran

(74) *Attorney, Agent, or Firm* — Oliff PLC

(57) ABSTRACT

A technique for presenting display screens of a plurality terminals connected to a network on a multi-window screen of a display screen of a display device. A communication unit receives image data captured and then sent by each terminal having a screen capture function. A display control unit controls an image synthesizer to synthesize the captured image data into single screen multi-window format data. A multi-window screen is thus presented.

20 Claims, 25 Drawing Sheets

(56) References Cited

U.S. PATENT DOCUMENTS

| | | | |
|---|---|---|---|
| 2002/0078447 A1* | 6/2002 | Mizutome et al. | 725/37 |
| 2002/0093626 A1* | 7/2002 | Asamura | 353/30 |
| 2002/0105623 A1* | 8/2002 | Pinhanez | 353/69 |
| 2003/0017846 A1* | 1/2003 | Estevez et al. | 455/556 |
| 2003/0110244 A1* | 6/2003 | Mondal | 709/223 |
| 2003/0117587 A1* | 6/2003 | Olson et al. | 353/30 |
| 2003/0120849 A1* | 6/2003 | Roslak et al. | 710/303 |
| 2003/0121027 A1* | 6/2003 | Hines | 717/135 |
| 2006/0028584 A1* | 2/2006 | Iizuka et al. | 348/584 |
| 2006/0126817 A1* | 6/2006 | Beckett et al. | 379/265.06 |

* cited by examiner 1a-1d: TERMINALS
2: NETWORK INTERACTIVE DISPLAY DEVICE
3: NETWORK
100: DISPLAY SYSTEM

| TERMINAL NAME | PC-1 | PC-2 | PC-3 | PDA-1 |
|---|---|---|---|---|
| TRUE SIZE | 640×512 | 640×410 | 640×480 | 384×512 |
| TRUE ORIGIN | 0,0 | 640,51 | 0,528 | 768,512 |

DATE AND TIME: MAY 21, 2002, 17:00:32

| NUMBER OF TERMINALS | | FIRST | SECOND | THIRD | FOURTH |
|---|---|---|---|---|---|
| 4 | PRIORITY | HIGH | NONE | NONE | NONE |
| | | ↓ | ↓ | ↓ | ↓ |
| TENTATIVE SIZE | | 1280×768 | 427×256 | 427×256 | 426×256 |
| TENTATIVE ORIGIN | | 0, 0 | 0,768 | 427,768 | 854,768 |

| TERMINAL NAME | PC-1 | PC-2 | PC-3 | PDA-1 |
|---|---|---|---|---|
| TRUE SIZE | 960×768 | 341×256 | 341×256 | 192×256 |
| TRUE ORIGIN | 160,0 | 43,768 | 470,768 | 971,768 |

DATE AND TIME: MAY 21, 2002, 17:00:32

SELECT

F I G. 25
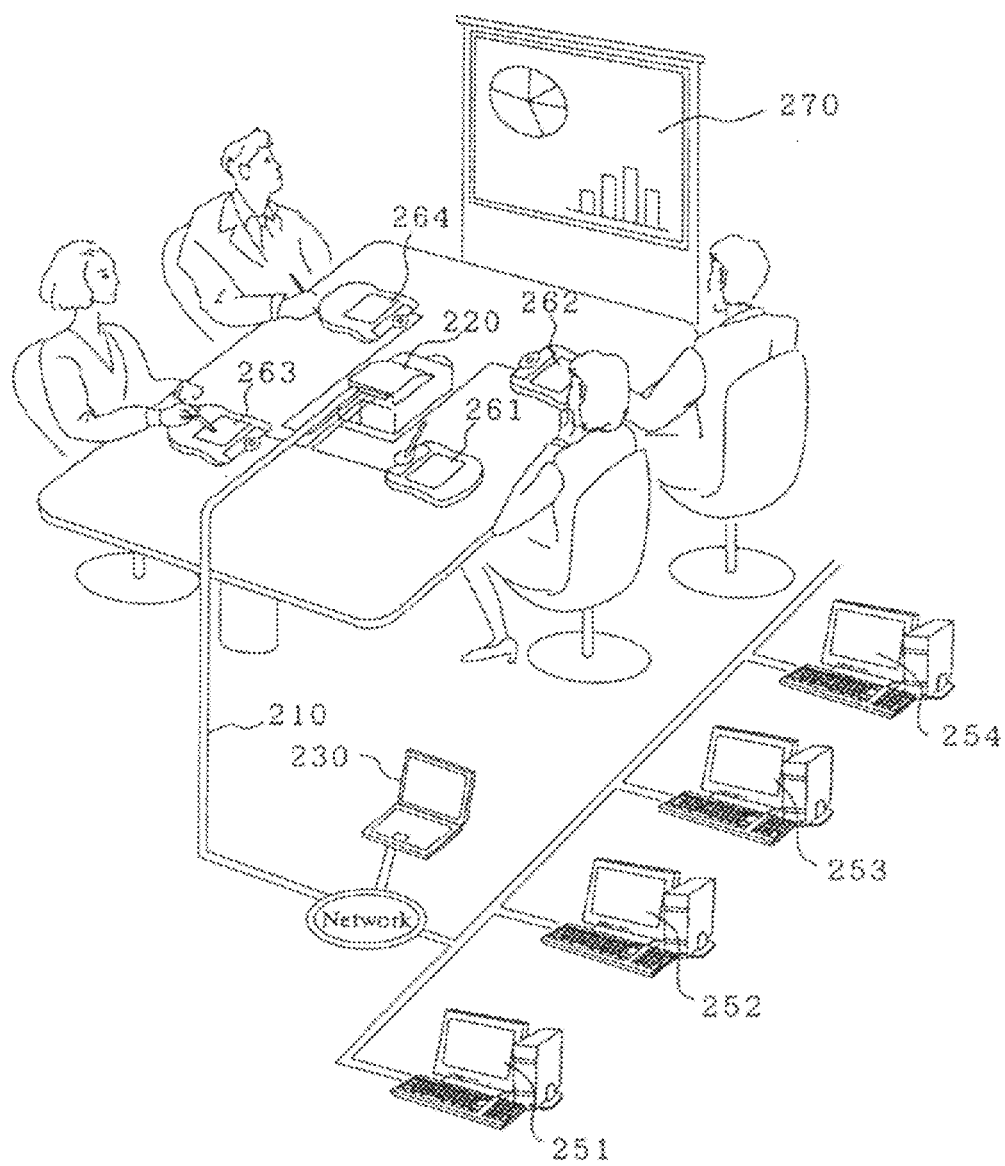

DISPLAY SYSTEM, NETWORK INTERACTIVE DISPLAY DEVICE, TERMINAL, AND CONTROL PROGRAM

This is a Continuation of application Ser. No. 10/623,518 filed Jul. 22, 2003. The disclosure of the prior application is hereby incorporated by reference herein in its entirety.

BACKGROUND OF THE INVENTION

1. Field of the Invention

The present invention relates to a technique that presents screens of a plurality terminals connected to a network on a single screen of a display device in a multi-window presentation fashion.

2. Description of the Related Art

FIG. 25 shows a structure of a conventional display system. Connected to a network 210 as shown are a projector 220, a notebook computer 230, and desk-top computers 251, 252, 253, and 254 as network interactive display devices. Further connected to the network 210 are tablets 261, 262, 263, and 264, each of which directly inputs drawings to the projector 220 and inserts data in the already projected drawings. A screen capture software program is already installed on each of the notebook computer 230 and the desk-top computers 251, 252, 253, and 254.

In the conventional display system thus constructed, the screen capture software program captures the content displayed on the screen of the notebook computer 230, and the captured image data is then sent to the projector 220 through the network 210. The screen presented on the notebook computer 230 is thus projected and displayed on the projector 220. Operating a remote controller as an attachment to the projector 220, the projected image on the projector 220 is switched from a screen of the notebook computer 230 to a screen of the desk-top computer 251, for example.

The image presented on the projector 220 in the conventional display system is one of the computer screen images of the notebook computer 230, and the desk-top computers 251, 252, 253, and 254. To compare the contents of one screen to another of the notebook computer 230 and the desk-top computers 251, 252, 253, and 254, the user is forced to switch the screens from one to another. There is a growing need for a function that allows screens of a plurality of personal computers on a single screen of a display device.

To satisfy such a need, development efforts have been made. However, no such a display system satisfying the need exist. For one reason, a large throughput is required of a projector (a network interactive display device) in a display system, and a workload on a network also increases.

SUMMARY OF THE INVENTION

Accordingly, it is an object of the present invention to provide a network interactive display device and a display control program for presenting display screens of a plurality of terminals, connected to a network, on a screen of a display of the display device in a multi-window presentation fashion.

It is also another object of the present invention to provide a display system, a network interactive display device, a display control software program, a network interactive projector, a network interactive plasma display apparatus, a network interactive liquid-crystal display apparatus, a terminal, and a control software program, each for presenting display screens of a plurality of terminals, connected to a network, on a screen of a display of the network interactive display device in a multi-window presentation fashion without introducing an increase in workload on the network interactive display device and the network.

A display system in one aspect of the present invention includes a plurality of terminals, each terminal having a screen capture function, and sending image data, captured using the screen capture function, over a network, and a network interactive display device, including a display, and receiving the captured image data transmitted from the terminal through the network, and having a multi-window screen presentation function for synthesizing the captured image data into single screen multi-window format data to be displayed on a display screen of the display, wherein, as processes required to present the single screen multi-window format data on the display screen of the display of the network interactive display device, the terminal performs a size conversion process of an image size of the image data captured using the screen capture function and the network interactive display device acquires the captured image data subsequent to the size conversion thereof from the terminal, and synthesizes the received captured image data.

The size conversion process for a multi-window screen presentation function is performed on the terminal. The display system presents the screens of the plurality terminals connected to the network on the display of the network interactive display device in a multi-window format without introducing an increase in workload on the network interactive display device and the network.

In the display system of a preferred embodiment of the present invention, the network interactive display device may divide the display screen of the display into windows of the number equal to the number of terminals to be displayed, may determine a display size of the window assigned to each terminal to be displayed, and may send information of the display size to the terminal, and the terminal may perform the size conversion on the image size of the captured image data to the received display size when the terminal receives the display size.

In accordance with the preferred embodiment of the present invention, the terminal performs the size conversion process based on the display size determined by the network interactive display device.

In the display system of a preferred embodiment of the present invention, the terminal may further perform a color conversion process on the captured image data in accordance with a color count of the display of the network interactive display device before sending the captured image data to the network interactive display device, in addition to the size conversion process on the image data captured using the screen capture function.

In the preferred embodiment of the present invention, the workload on the network interactive display device is further reduced because the terminal performs the color conversion process before sending the captured image data to the network interactive display device.

In the display system of a preferred embodiment of the present invention, the network interactive display device may also send the color count of own display to the terminal when sending the display size to the terminal, while the terminal may perform the color conversion process in response to the color count received from the network interactive display device.

In accordance with the preferred embodiment of the present invention, the terminal performs the color conversion process in response to the color count designated by and received from the network interactive display device.

In the display system of a preferred embodiment of the present invention, the network interactive display device may include a projector.

In accordance with the preferred embodiment of the present invention, the network interactive display device is the projector.

In the display system of a preferred embodiment of the present invention, the network interactive display device may include a plasma display.

In accordance with the preferred embodiment, a plasma display is used as the network interactive display device.

In the display system of a preferred embodiment of the present invention, the network interactive display device may include a liquid-crystal monitor.

In accordance with the preferred embodiment, a liquid-crystal monitor is used as the network interactive display device.

In the display system of a preferred embodiment of the present invention, the network interactive display device may include an organic EL display.

In accordance with the preferred embodiment, an organic EL (Electroluminescent) display is used as the network interactive display device.

In the display system of a preferred embodiment of the present invention, the terminal may include one of a personal computer and a PDA (Personal Digital Assistant).

In accordance with the preferred embodiment of the present invention, one of a personal computer and a PDA is used as the terminal.

A network interactive display device in another aspect of the present invention is connected to a plurality of terminals through a network, each terminal having a screen capture function, and includes a display, a communication unit for communicating in a two-way fashion with each of the terminals, and a display control unit, wherein the communication unit receives the image data which has been captured by each terminal through the screen capture function thereof, and which has been size converted to a predetermined image size by each terminal, and the display control unit has a multi-window screen presentation function for synthesizing the captured image data received by the communication unit into single screen multi-window format data to be displayed on a display screen of the display.

Since the network interactive display device receives the captured image data in the size converted form thereof from the terminal, and synthesizes the received image data, the workload of processing in the multi-window presentation is reduced in the network interactive display device.

In the network interactive display device of a preferred embodiment of the present invention, the display control unit may have an insertion function for inserting a new window into a current display screen to display the new window.

In accordance with the preferred embodiment, the network interactive display device has the insertion function.

In the network interactive display device of a preferred embodiment of the present invention, the user may select at will a terminal, which provides the captured image data to be displayed on the display screen of the display, from among the plurality of terminals connected to the network interactive display device.

In accordance with the preferred embodiment, the network interactive display device allows the user to select at will a terminal, which is to provide the captured image data to be displayed on the display screen of the display, from among the plurality of terminals connected to the network interactive display device.

In the network interactive display device of a preferred embodiment of the present invention, the terminal that provides the captured image data to be displayed on the display screen of the display may be selected in a two-way communication of the communication unit by one of the network interactive display device and the terminals.

In accordance with the preferred embodiment, the network interactive display device allows the terminal displaying the captured image data on the display screen to be selected in a two-way communication of the communication unit by one of the network interactive display device and the terminal.

In the network interactive display device of a preferred embodiment of the present invention, the display control unit may have an expansion display function for expanding a predetermined window from among a plurality of windows forming a multi-window screen displayed on the display screen of the display.

In accordance with the preferred embodiment, the network interactive display device has the expansion display function for expanding the predetermined window.

In the network interactive display device of a preferred embodiment of the present invention, the display control unit may have a single-window screen selection function for switching the display screen from a predetermined window from among a plurality of windows forming a multi-window screen displayed on the display screen to a single-window full screen.

In accordance with the preferred embodiment, the network interactive display device has the single-window screen selection function for switching the display screen from the predetermined window to the single-window full screen.

In the network interactive display device of a preferred embodiment of the present invention, the display control unit may have an erase function for erasing a predetermined window from among a plurality of windows forming a multi-window screen displayed on the display screen of the display.

In accordance with the preferred embodiment, the network interactive display device has the erase function for erasing the predetermined window.

In the network interactive display device of a preferred embodiment of the present invention, the predetermined window may be selected in response to an operation by the user.

In accordance with preferred embodiments, the network interactive display device allows the user to select the window to be expanded, the window to be switched to the single-window full screen, and the window to be erased.

In the network interactive display device of a preferred embodiment of the present invention, the predetermined window may be selected by one of the network interactive display device and the terminal in a two-way communication of the communication unit thereof.

In the preferred embodiment, the window to be expanded, the window to be switched to the single-window full screen, or the window to be erased is designated by one of the network interactive display device or the terminal.

In the network interactive display device of a preferred embodiment of the present invention, the image captured data received from the terminal may be obtained by designating the whole or a portion of the display screen of the terminal.

In accordance with the preferred embodiment, the network interactive display device displays the captured image data, which is obtained using full-screen capturing or partial-screen capturing.

In the network interactive display device of a preferred embodiment of the present invention, the captured image data received from the terminal may be obtained by detecting and capturing only a change on the display screen of the terminal.

In accordance with the preferred embodiment, the workload on the network is reduced by capturing only the change on the screen of the terminal. The network interactive display device thus presents image data which is a combination of existing captured data and the changed component of data.

In a preferred embodiment of the present invention, the network interactive display device may include a display size determining unit that divides the display screen of the display into windows of the number equal to the number of terminals to be displayed, and determines a display size of the window to which the terminal to be displayed is assigned, and a controller that sends the display size determined by the display size determining unit to the corresponding terminal through the communication unit, wherein the controller receives, through the communication unit, the captured image data, having the converted size equal to the display size of the window assigned to the terminal, from the terminal to which the display size is sent, and controls the display control unit to synthesize the received captured image data into single screen multi-window format data to be displayed on the display screen of the display.

In accordance with the preferred embodiment, the display size converted by the terminal is set to be display size determined by the display size determining unit.

In the network interactive display device of a preferred embodiment of the present invention, an aspect ratio of the window assigned to the terminal to be displayed may be equalized to an aspect ratio of the display screen of the display of the terminal.

In accordance with the preferred embodiments of the present invention, the network interactive display device provides a display screen free from discordance.

In the network interactive display device of a preferred embodiment of the present invention, through the communication unit, the controller may also send a display color count of the display to the terminal when sending the display size to the terminal, may receive the captured image data having the converted size equal to the display size of the window assigned to the terminal and having the display color count converted to the display color count of the display of the network interactive display device, from the terminal to which the display size and the display color count have been sent, and may control the display control unit to synthesize the received captured image data into single screen multi-window format data to be displayed on the display screen of the display.

In accordance with the preferred embodiment, the network interactive display device receives, from the terminal, the captured image data the terminal has color converted in addition to the size conversion process for contraction and synthesizes the received image data. The workload of processing in the multi-window presentation is reduced in the network interactive display device.

In the network interactive display device of a preferred embodiment of the present invention, a communication protocol of the communication unit may include the TCP/IP protocol.

In accordance with the preferred embodiment, the widely used TCP/IP is used as the communication protocol of the communication unit.

In the network interactive display device of a preferred embodiment of the present invention, the network may include one of a LAN, a radio LAN, and a near-field communication radio LAN.

In accordance with the preferred embodiment, one of the LAN (Local-Area Network), the radio LAN, the near-field communication radio LAN is used as the network.

A network interactive projector in yet another aspect of the present invention includes one of the above-referenced network interactive display devices.

In accordance with the above aspect, the projector has the above-referenced advantages of the network interactive display device.

In the network interactive projector of a preferred embodiment of the present invention, the display may include one of a liquid-crystal light valve, an LCoS light valve, and a DMD (Digital Micromirror Device) (Trademark of Texas Instruments).

In accordance with the preferred embodiment, the projector including one of the liquid-crystal light valve, the LCoS light valve, and the DMD has the above-referenced advantages of the network interactive display device.

A network interactive plasma display apparatus in yet another aspect of the present invention includes one of the above-referenced network interactive display devices, wherein the display includes a plasma display panel.

In accordance with the above aspect of the present invention, the plasma display apparatus provides the above-referenced advantages of the network interactive display device.

A network interactive liquid-crystal display apparatus in yet another aspect of the present invention includes one of the above-referenced network interactive display devices, wherein the display includes a liquid-crystal panel.

In accordance with the above aspect of the present invention, the liquid-crystal display apparatus have the above-referenced embodiments of the network interactive display device.

A network interactive organic EL display apparatus in a further aspect of the present invention includes one of the above-referenced network interactive display devices, wherein the display includes an organic EL panel.

In accordance with the above aspect of the present invention, the network interactive organic EL display apparatus provides the above-referenced advantages of the network interactive display device.

The present invention in a further aspect relates to a display control software program of a CPU that constitutes the display control unit of one of the above-referenced network interactive display devices.

In accordance with the above aspect of the present invention, the display control program allows a display device to provides the above-referenced advantages of the network interactive display device.

In yet another aspect of the present invention, a terminal, connected to one of the above-referenced network interactive display devices includes a display, a communication unit that communicates in a two-way fashion with the network interactive display device, a screen capture processor that captures the content displayed on the display screen of the display, an image converter which converts the image data captured by the screen capture processor to image data having a predetermined image size, and a controller that sends the captured image data, size converted by the image converter, from the communication unit to the network interactive display device, wherein the terminal generates the captured image data that is to be displayed on one of the multi windows displayed on the display screen of the network interactive display device.

When the captured image data to be displayed on one of the windows of the screen of the network interactive display device is generated, a part of the process required for the multi-window presentation, i.e., the size conversion process is performed by the terminal. The terminal thus contributes to a reduction in the workload on the network interactive display device.

In the terminal of a preferred embodiment of the present invention, the display screen of the display of the network interactive display device may be divided into windows of the number equal to the number of terminals to be displayed, a display size of the window assigned to each terminal to be displayed is determined, and the image converter converts the image data captured by the screen capture processor to image data having the display size assigned to own terminal.

In accordance with the preferred embodiment, the size conversion process is carried out based on the display size determined by the network interactive display device.

In the terminal of a preferred embodiment of the present invention, the image converter may perform a color conversion on the captured image data to match the display color count of the display of the network interactive display device in addition to the size conversion process, and the controller may send the captured image data, which has been subjected to the size conversion process and the color conversion process, from the communication unit to the network interactive display device.

In accordance with the preferred embodiment, the image converter performs the color conversion on the captured image data in addition to the size conversion process, thereby further reducing the workload on the network interactive display device.

The present invention in a further aspect relates to a control software program of a CPU that constitutes each processor of one of the above-referenced terminals.

In accordance with the above aspect, the control program allows a terminal to have the above-referenced advantages of the above terminal.

The present invention in a further aspect relates to a network interactive display device connected to each of a plurality of terminals through a network, each terminal having a screen capture function, and includes a display, a communication unit for communicating in a two-way fashion with each of the terminals, and a display control unit, wherein the display control unit has a multi-window screen presentation function for synthesizing the captured image data, captured by each terminal through the screen capture function and received by the communication unit, into single screen multi-window format data to be displayed on a display screen of the display.

The network interactive display device presents the screens of the plurality terminals connected to the network on the display screen of a display of the network interactive display device in a multi-window format.

In the network interactive display device of a preferred embodiment of the present invention, the display control unit may have an insertion function for inserting a new window into a current display screen to display the new window.

In accordance with the preferred embodiment, the network interactive display device has the insertion function.

In the network interactive display device of a preferred embodiment of the present invention, the user may select at will a terminal, which provides the captured image data to be displayed on the display screen of the display, from among the plurality of terminals connected to the network interactive display device.

In accordance with the preferred embodiment, the network interactive display device allows the user to select at will a terminal, which is to provide the captured image data to be displayed on the display screen of the display, from among the plurality of terminals connected to the network interactive display device.

In the network interactive display device of a preferred embodiment of the present invention, the terminal that provides the captured image data to be displayed on the display screen of the display may be selected in a two-way communication of the communication unit by one of the network interactive display device and the terminal.

In accordance with the preferred embodiment, the network interactive display device allows the terminal providing the captured image data on the display screen to be selected in a two-way communication of the communication unit by one of the network interactive display device and the terminal.

In the network interactive display device of a preferred embodiment of the present invention, the display control unit may have an expansion display function for expanding a predetermined window from among a plurality of windows forming a multi-window screen displayed on the display screen of the display.

In accordance with the preferred embodiment, the network interactive display device has the expansion display function for expanding the predetermined window.

In the network interactive display device of a preferred embodiment of the present invention, the display control unit may have a single-window screen selection function for switching the display screen from a predetermined window from among a plurality of windows forming a multi-window screen displayed on the display screen of the display to a single-window full screen.

In accordance with the preferred embodiment, the network interactive display device has the single-window screen selection function for switching the display screen from the predetermined window to the single-window full screen.

In the network interactive display device of a preferred embodiment of the present invention, the display control unit may have an erase function for erasing a predetermined window from among a plurality of windows forming a multi-window screen displayed on the display screen of the display.

In accordance with the preferred embodiment, the network interactive display device has the erase function for erasing the predetermined window.

In the network interactive display device of a preferred embodiment of the present invention, the predetermined window may be selected in response to an operation by the user.

In accordance with preferred embodiments, the network interactive display device allows the user to select the window to be expanded, the window to be switched to the single-window full screen, and the window to be erased.

In the network interactive display device of a preferred embodiment of the present invention, the predetermined window may be selected by one of the network interactive display device and the terminal in a two-way communication of the communication unit thereof.

In the preferred embodiment, any of the window to be expanded, the window to be switched to the full-screen mode, or the window to be erased is designated by one of the network interactive display device and the terminal.

In the network interactive display device of a preferred embodiment of the present invention, the captured image data received from the terminal may be obtained by designating the whole or a portion of the display screen of the terminal.

In accordance with the preferred embodiment, the network interactive display device displays the captured image data, which is obtained using full-screen capturing or partial-screen capturing.

In the network interactive display device of a preferred embodiment of the present invention, the captured image data received from the terminal may be obtained by detecting and capturing only a change on the display screen of the terminal.

In accordance with the preferred embodiment, the workload on the network is reduced by capturing only the change on the screen of the terminal. The network interactive display device thus presents image data which is a combination of existing captured data and the changed component of data.

In the network interactive display device of a preferred embodiment of the present invention, the display control unit may include a window area information generator which divides the display screen of the display into windows of the number equal to the number of terminals to be displayed, and generates window area information containing a display size of the window to which the terminal to be displayed is assigned, and information identifying a display position of the window, an image synthesizer which synthesizes the captured image data from the terminals into single screen multi-window format data in accordance with the window area information generated by the window area information generator, thereby generating synthesized image data, and an image processor which processes the synthesized image data generated by the image synthesizer, thereby generating display image data and outputting the display image data to the display.

In the network interactive display device of a preferred embodiment of the present invention, the image synthesizer may synthesize the captured image data by contracting or expanding the captured image data from each terminal with an aspect ratio of the image size of the captured image data maintained.

In accordance with the preferred embodiment, the network interactive display device provides a display screen free from discordance.

In the network interactive display device of a preferred embodiment of the present invention, a communication protocol of the communication unit may include the TCP/IP protocol.

In accordance with the preferred embodiment, the widely used TCP/IP is used as the communication protocol of the communication unit.

In the network interactive display device of a preferred embodiment of the present invention, the network may include one of a LAN, a radio LAN, and a near-field communication radio LAN.

In accordance with the preferred embodiment, one of the LAN, the radio LAN, the near-field communication radio LAN is used as the network.

A network interactive projector in a further aspect of the present invention includes one of the above-referenced network interactive display devices.

In accordance with the above aspect of the present invention, the projector has the above-referenced advantages of the network interactive display device.

In the network interactive projector of a preferred embodiment of the present invention, the display may include one of a liquid-crystal light valve, an LCoS light valve, and a DMD.

In accordance with the preferred embodiment, the projector including one of the liquid-crystal light valve, the LCoS light valve, and the DMD has the above-referenced advantages of the network interactive display device.

A network interactive plasma display apparatus in a further aspect of the present invention includes one of the above-referenced network interactive display devices, wherein the display includes a plasma display panel.

In accordance with the above aspect, the plasma display apparatus have the above-referenced advantages of the network interactive display device.

A network interactive liquid-crystal display apparatus in a further aspect of the present invention includes one of the above-referenced network interactive display devices, wherein the display includes a liquid-crystal panel.

In accordance with the above aspect, the liquid-crystal display apparatus have the above-referenced embodiments of the network interactive display device.

A network interactive organic EL display apparatus in a further aspect of the present invention includes one of the above-referenced network interactive display devices, wherein the display includes an organic EL panel.

In accordance with the above aspect, the network interactive organic EL display apparatus provides the above-referenced advantages of the network interactive display device.

The present invention in a further aspect relates to a display control software program of a CPU that constitutes the display control unit of one of the above-referenced network interactive display devices.

In accordance with the above aspect, the display control program provides a display device with the above-referenced advantages of one of the above network interactive display devices.

BRIEF DESCRIPTION OF THE DRAWINGS

FIG. 25 illustrates a conventional display system;

DESCRIPTION OF THE PREFERRED EMBODIMENTS

First Embodiment

Figure 1:
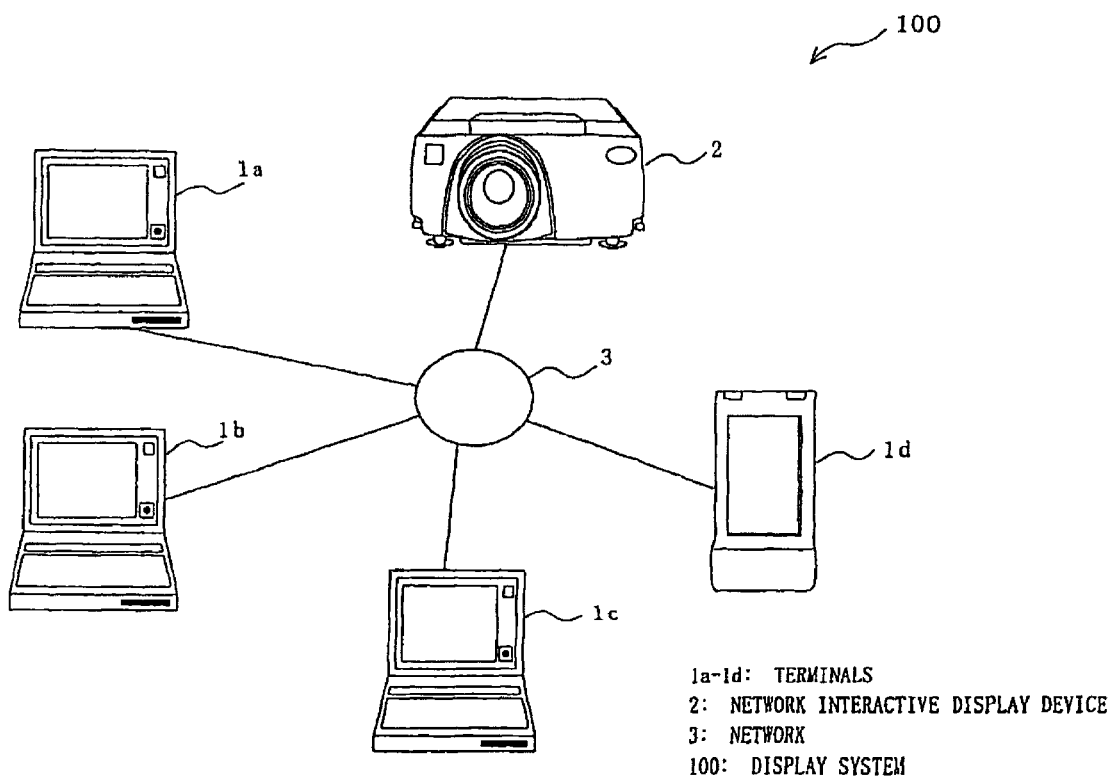
FIG. 1 illustrates a network of a display system including a network interactive display device in accordance with preferred embodiments of the present invention.

FIG. 1 illustrates a network of a display system 100 including a network interactive display device 2 in accordance with preferred embodiments of the present invention.

The display system 100 includes a plurality of terminals (only four terminals 1a, 1b, 1c, and 1d are shown in FIG. 1), and the network interactive display device 2 (a projector here) having a multi-window screen presentation function as one of major functions of the present invention. The plurality of terminals 1 are respectively connected to the network interactive display device 2 (hereinafter simply referred to the display device 2) through a network 3 in a two-way communication based on the TCP/IP protocol. A unique name is provided beforehand to each terminal 1 (hereinafter referred to as a terminal name). The network 3 may be any of a LAN (Local Area Network), a radio LAN, and a near-field communication radio LAN such as Bluetooth (Tradename of Bluetooth SIG Inc., U.S.A.).

The display system 100 allows screens presented on the plurality of terminals 1 to be concurrently presented on a multi-window display screen of the display device 2. Such a system 100 is useful in a conference or a presentation. The terminal 1 and the display device 2 will now be discussed in detail.

Figure 2:
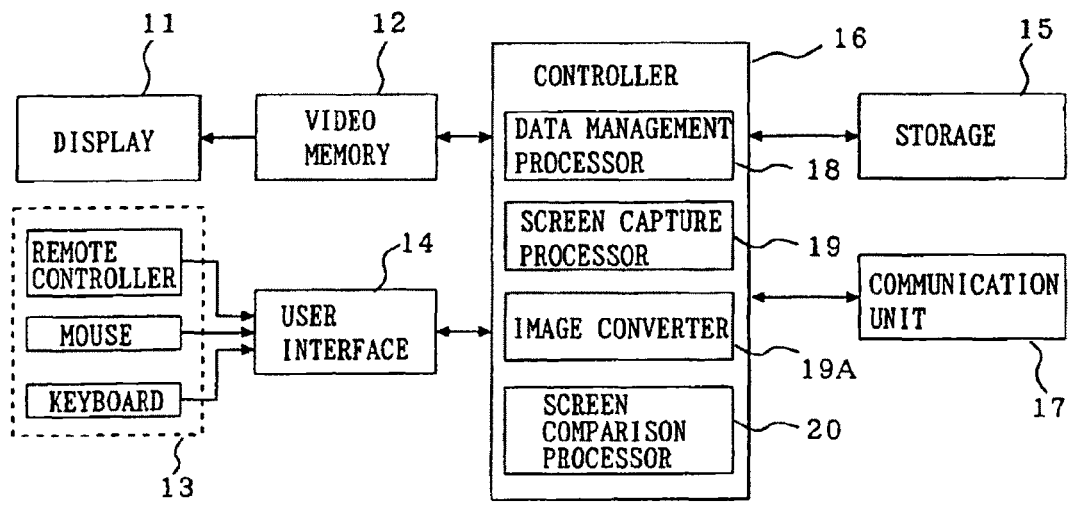
FIG. 2 is a block diagram illustrating the structure of a terminal in accordance with a first preferred embodiment of the present invention.

FIG. 2 is a block diagram illustrating the structure of the terminal 1 in accordance with a first preferred embodiment of the present invention.

The terminal 1 may be a personal computer or a PDA (Personal Digital Assistant). The terminal 1 includes a display 11 for presenting a diversity of information such as materials for presentation, a video memory 12 for storing the content to be presented on the display 11, an input section 13 including of a tablet, a mouse, or a keyboard, a user interface 14 for detecting an operational input entered from the input section 13 and outputting the operational input to a controller (CPU) 16, a storage 15 for storing application software programs (such as a control program) for performing the processes of the present invention and a variety of pieces of data, the controller 16, and a communication unit 17.

The control program stored in the storage 15 is used to perform a terminal control function to perform a multi-window screen presentation function on the network interactive display device 2, a screen capture function to capture a whole or a part of the screen of the display 11, an image conversion function to convert captured image data acquired using the screen capture function into data in a format of a display 21 of the network interactive display device 2, and a function to detect a change on the screen of the display 11. The application software programs and the CPU constitute a data management processor 18, a screen capture processor 19, an image converter 19A, and a screen comparison processor 20.

The controller 16 receives a variety of requests, including a connection request, a display request, an expansion display request, a request to switch to a single-window full screen, and an erase request through the user interface 14 or the communication unit 17, and performs processes responsive to each request. Under the control of the controller 16, the image converter 19A converts the image data acquired by the screen capture processor 19, and the communication unit 17 sends the converted captured image data to the network interactive display device 2.

The communication unit 17 carries out a two-way communication with the network interactive display device 2. The communication protocol used here is the TCP/IP. The communication unit 17 has a protocol processing function for ARP, ICMP, IP, TCP, UDP, etc. required for the TCP/IP connection. This protocol processing function is carried out under the control of an OS.

The conversion processes performed by the image converter 19A are required when the display device 2 to be discussed later performs a multi-window screen presentation. Specifically, the conversion processes include a size conversion process to convert the captured image data into data in a display size of a window assigned to own terminal 1, and a color conversion process to convert the captured image data into data having a display color count of the display 21 of the display device 2. The terminal 1 performs the conversion processes, required to present a multi-window screen on the display device 2, on the captured image data acquired by the screen capture processor 19, and then sends the converted captured image data to the display device 2.

Figure 3:
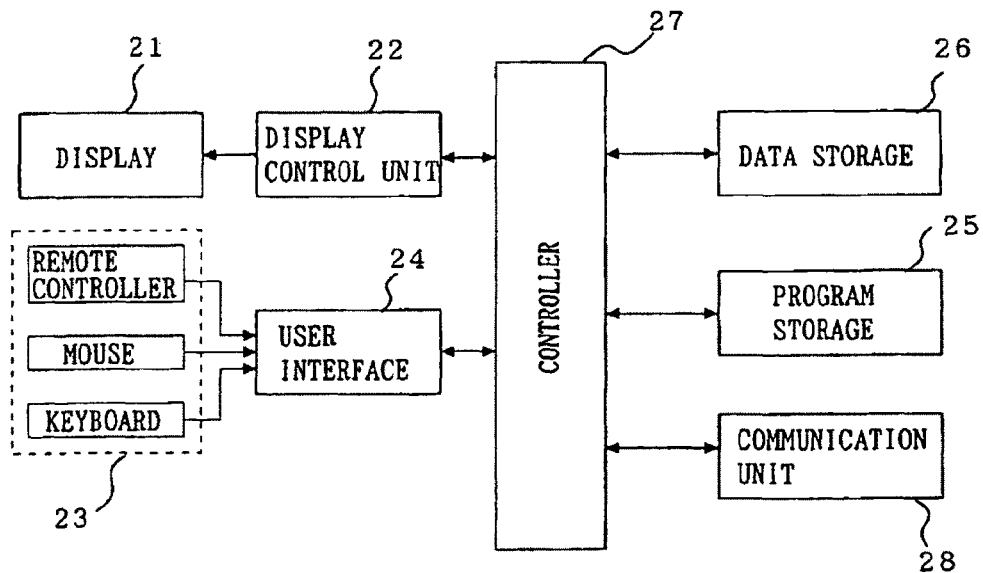
FIG. 3 is a block diagram illustrating the structure of a network interactive display device of the first preferred embodiment.

FIG. 3 is a block diagram illustrating the structure of the display device 2 of the first preferred embodiment.

The display device 2 includes the display 21, a display control unit 22 which has a multi-window screen presentation function, an expansion display function, a function to switch to the single-window full screen, an insertion function, and an erase function, and controls the display screen to be presented on the display 21, an input section 23 including a remote controller, a mouse, or a keyboard, a user interface 24 for detecting an operational input from the input section 23 and for outputting the operational input to a controller 27 to be discussed later, a program storage 25 for storing the display control program to perform the multi-window screen presentation function of the present invention, a data storage 26 for storing a variety of files and data required to carry out the display control program, a controller (CPU) 27 for generally controlling the display device 2, and a communication unit 28 for performing a two-way communication with each terminal 1.

The communication unit 28 carries out a two-way communication with the terminal 1. The communication protocol used here is the TCP/IP. The communication unit 28 has a protocol processing function for ARPICMP, IP, TCP, UDP, etc. required for the TCP/IP connection.

The display device 2 may be a plasma display, or a liquid-crystal display instead of the projector shown in FIG. 1. FIG. 3 shows major portions only related to the context of the present invention, and does not show other elements respectively uniquely relating to the projector, the plasma display, and the liquid-crystal display because they are not closely related to the context of the present invention. If the elements shown in FIG. 3 are added to each of an existing projector, an existing plasma display, and an existing liquid-crystal display, they respectively become a network interactive projector, a network interactive plasma display, and a network interactive liquid-crystal display. The display 21 is different depending on the type of the display device 2. Specifically, the display 21 is one of a liquid-crystal light valve, an LCoS light valve, or a DMD (Digital Micromirror Device) (Trademark of Texas Instruments) in the projector. The display screen of the display 21 becomes a projecting screen. The display 21 is a plasma display panel in a plasma display device, a liquid-crystal panel in a liquid-crystal display device, or an organic EL (Electroluminescent) panel in an organic EL display device.

Figure 4:
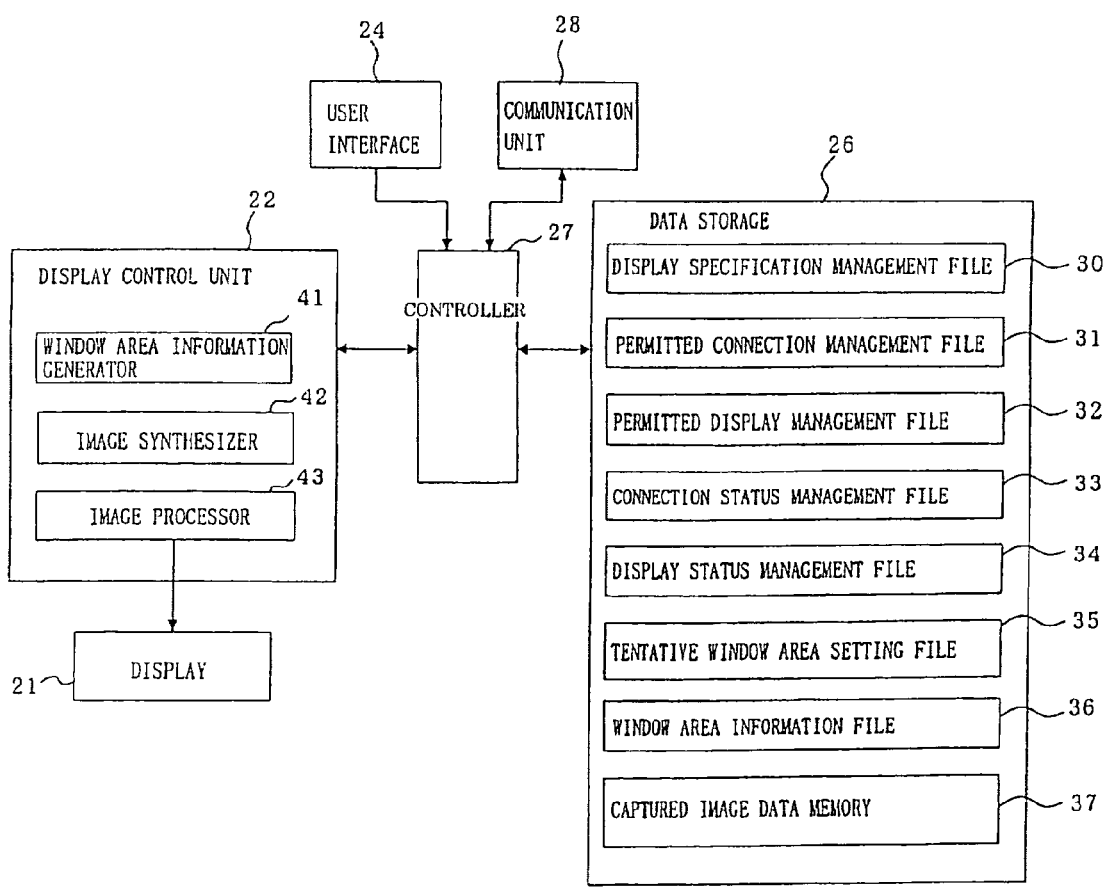
FIG. 4 is a functional diagram illustrating the function of the network interactive display device of the first preferred embodiment.

Referring to FIG. 4, a variety of files stored in the data storage 26 is discussed.

The data storage 26 stores a display specification management file 30, a permitted connection management file 31, a permitted display management file 32, a connection status management file 33, a display status management file 34, a tentative window area setting file 35, and a window area information file 36. The data storage 26 further includes a captured image data memory 37 for storing the captured image data sent from each terminal 1.

The display specification management file 30 registers a screen size representing the number of pixels in vertical and horizontal directions of the display screen of the display 21, and color count information representing a display color count of the display 21. In this preferred embodiment, the screen size is 1280×1024 (SXGA), and the color count is 167,777,216 colors.

The permitted connection management file 31 registers a terminal name of a terminal 1 which is permitted for connection. The permitted display management file 32 registers a terminal name of a terminal 1 which is permitted for screen display.

The connection status management file 33 registers a terminal name of a terminal 1 which is currently connected to the display device 2.

The display status management file 34 manages a display status of the current display 21. The display status management file 34 manages, in a table form, terminal information relating to the terminal 1 that is a source of the captured image data currently presented on the display screen of the display 21. The display status management file 34 is updated each time the display screen of the display 21 is modified. For example, if the display screen is switched from a four-window screen to a three-window screen, terminal information of the terminal 1 corresponding to an erased window is deleted. If the display screen is switched from a four-window screen to a five-window screen, terminal information of the terminal 1 corresponding to an added window is newly registered.

Figure 5:
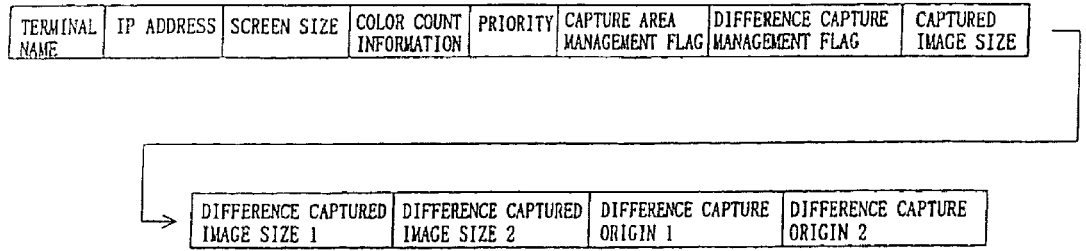
FIG. 5 illustrates items of terminal information managed in a display status management file.

FIG. 5 illustrates items of the terminal information managed in the display status management file 34.

The display status management file 34 contains, as items thereof, a "terminal name", an "IP address", a "screen size", "color count information", "priority", a "capture area management flag", a "difference capture management flag", a "captured image size", a "difference captured image size 1", a "difference captured image size 2", a "difference capture origin 1", and a "difference capture origin 2".

The "terminal name" is a name provided beforehand to the terminal 1. The "screen size" is the number of pixels in the vertical and horizontal directions of the display screen of the display 11. For example, an SXGA terminal has 1280×1024 pixels, and an XGA terminal has 1024×768 pixels. The "color count information" represents the number of display colors of the display 11, and may be 256 colors, or 167,777,216 colors, for example. The terminal name, the IP address, the screen size, and the color count information are the items that must be stored in the display status management file 34 during a registration. Other items are set (updated) by the user as necessary.

The "priority" determines the size of the display size of each window assigned to the terminal 1 that is identified by the terminal name. The priority takes "highest", "high" or "none". As will be discussed in detail, the display size having a higher priority order becomes larger. The "capture area management flag" manages the capturing as to whether the screen of the terminal 1 identified by the terminal name is captured in a full-screen capture mode or a partial-screen capture mode. The capture area management flag is "0" in the full-screen capture mode, which is a standard capture mode, and "1" in the partial-screen capture mode.

The "difference capture management flag" manages the capture of whether the screen of the terminal 1 identified by the terminal name is captured in a normal capture mode or a change capture mode (hereinafter referenced to as a difference capture mode). The difference capture management file is "0" in the normal capture mode, or "1" in the difference capture mode.

The "captured image size" is the size of the captured image data (the number of pixels in the vertical and horizontal directions) when the capture area management flag is "1", i.e., in the partial-screen capture mode.

The "difference captured image size 1" and the "difference captured image size 2" represent the sizes of two different areas acquired in the difference capture when the difference capture management flag is "1". The "difference capture origin 1", and the "difference capture origin 2" are the origins of the two different areas acquired in the difference capture, and are the absolute coordinates within an area defined by the captured image size.

Figures 11A, 11B:
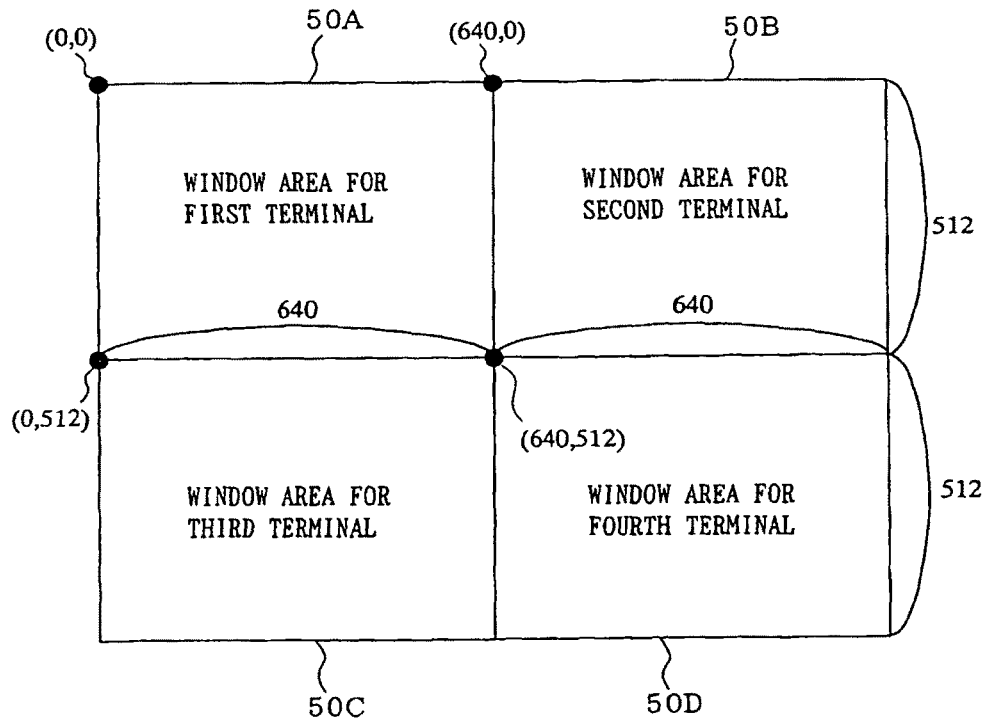
FIG. 11A illustrates a specific structure of a table held in a tentative window area setting file.
FIG. 11B illustrates a tentative window area based on the table of FIG. 11A.
Figures 16A, 16B:
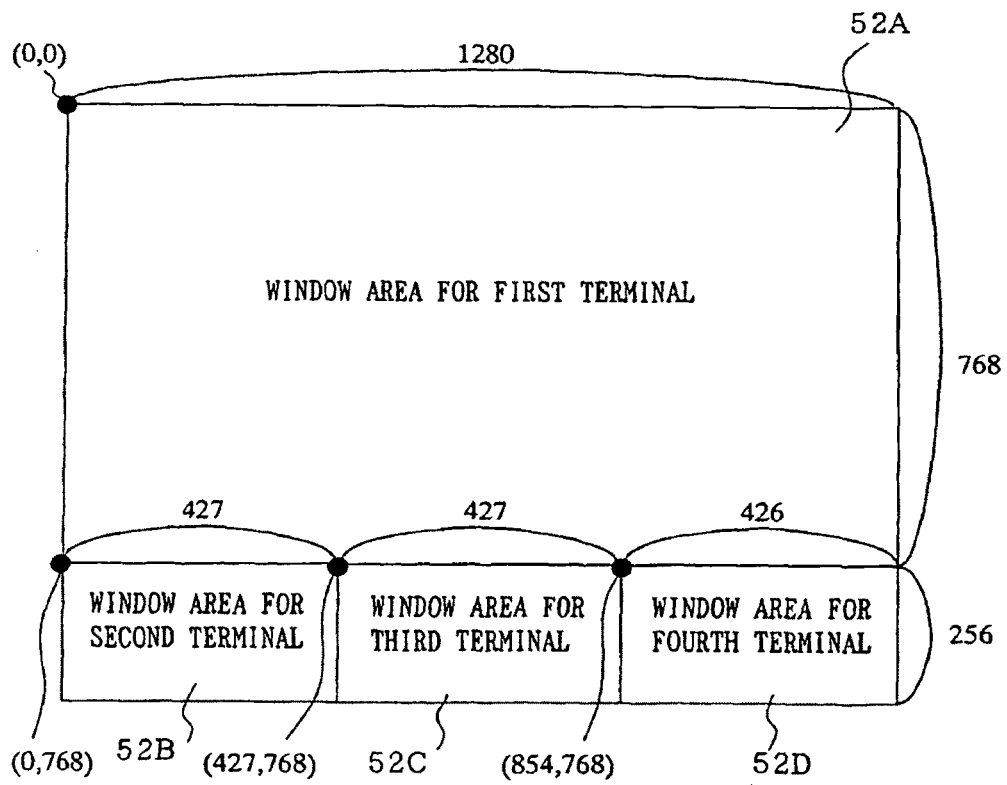
FIG. 16A illustrates a tentative window area setting table which is referenced when a priority order is updated.
FIG. 16B illustrates a tentative window area based on the table of FIG. 16A.

The tentative window area setting file 35 is a file in which information identifying a tentative window area assigned to the terminal 1 is set beforehand. The tentative window area setting file 35 contains a plurality of tables, each table prepared for the terminals. The table has a structure as shown in FIG. 11A and FIG. 16A. The table will be discussed in more detail later. The window area information file 36 will also be discussed later.

When a predetermined operation is performed on the input section 23, the display 21 displays the contents of the files 30, 31, 32, 33, 34, 35, and 36. The user thus checks and modifies the data on the display screen at will.

Returning to FIG. 4, the display control unit 22 includes a window area information generator 41 as a display size determining unit, an image synthesizer 42, and an image processor 43. The controller 27 receives a variety of requests such as a connection request, a display request, an insertion display request, an erase request, etc., received through the user interface 24 or the communication unit 28. In response to these requests, under the control of the controller 27, the processors 41, 42, and 43 respectively perform required processes while accessing necessary files in the data storage 26. The controller 27 thus controls the display 21. A display control program, stored in the program storage 25, for providing a multi-window screen presentation function and the controller (CPU) 27 constitute the display control unit 22.

From the display status management file 34, the window area information generator 41 learns the number of terminals 1 to be presented, and the priority order and the screen size of each terminal 1. The window area information generator 41 splits the display screen of the display 21 in accordance with the number of terminals 1 to be presented, and the priority order and the screen size of each terminal 1. The window area information generator 41 generates the window area information containing display size (hereinafter referred to as a window area size) of the window on the display 21 assigned to each terminal 1 to be displayed, and information identifying the display position of the window (the absolute coordinates at the top left corner of the window with respect to the display screen, hereinafter also referred to as an origin). The information is stored in the data storage 26 as the window area information file 36.

The controller 27 sends, to each terminal 1 to be displayed from the communication unit 28, the window area size of the window assigned to each terminal 1 to be displayed in the window area information file 36 generated in the window area information generator 41 together with the display color count of the display 21 held in the display specification management file 30. The captured image data memory 37 then stores the captured image data returned from each terminal 1 that has received these pieces of information, namely, the captured image data that has been subjected to the size conversion process and the color conversion process in accordance with the received window area size and display color count. The information referred to as the window area size is identical to a true window area size in the discussion that follows.

The image synthesizer 42 synthesizes the size converted and color converted captured image data from each terminal 1 stored in the captured image data memory 37 in accordance with the window area information file 36 generated by the window area information generator 41. Synthesized image data thus results.

The image processor 43 performs a scanning frequency conversion process on a variety of pieces of image data such as the synthesized image data generated by the image synthesizer 42, and the display status management file 34 of the data storage 26 which is referenced using an OSD (on-screen display) function, thereby generating display image data and outputting the display image data to the display 21. The image processor 43 includes a scan converter, for example.

Figure 6:
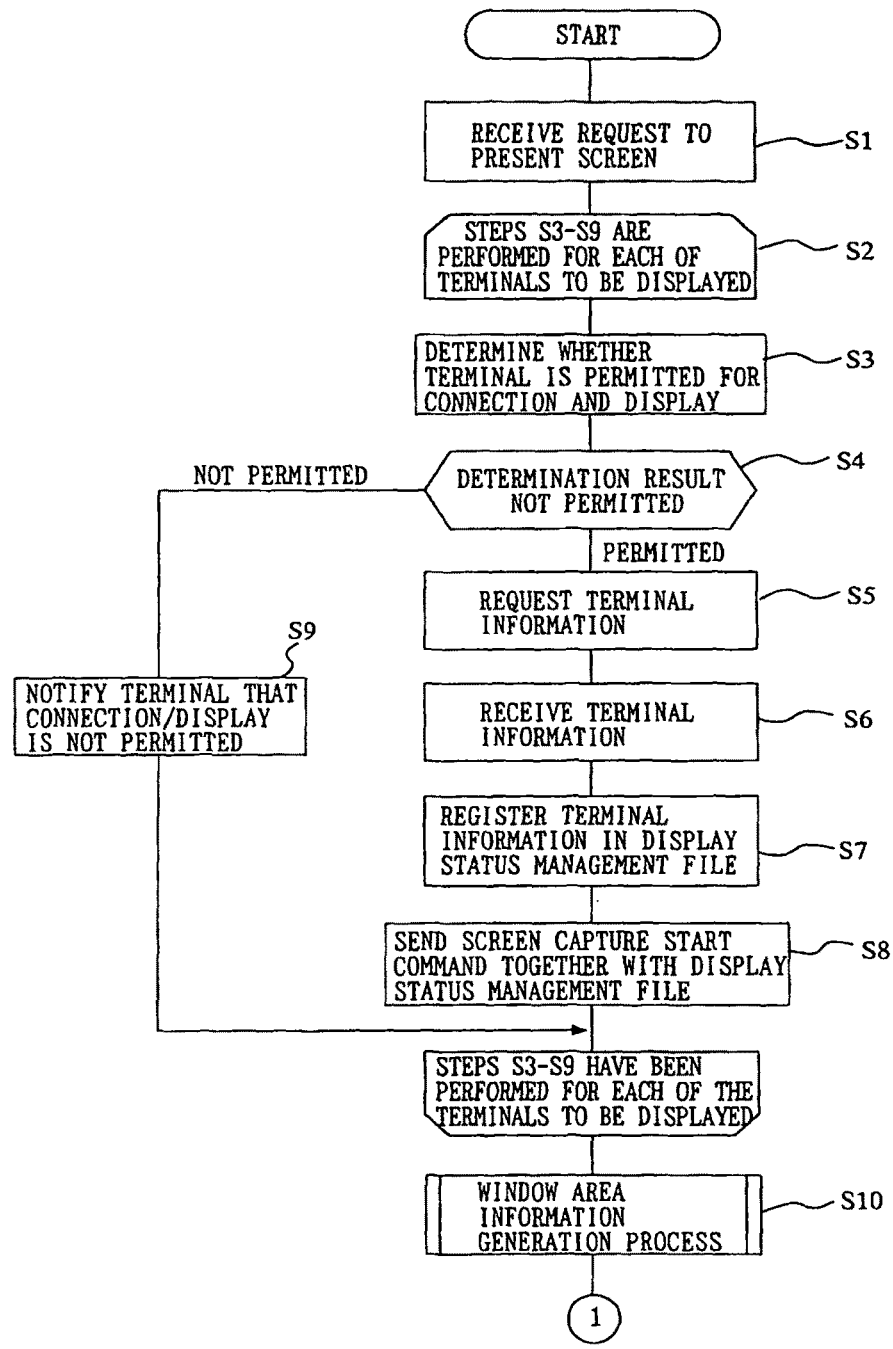
FIG. 6 is a flow diagram illustrating the operation of the first preferred embodiment.
Figure 7:
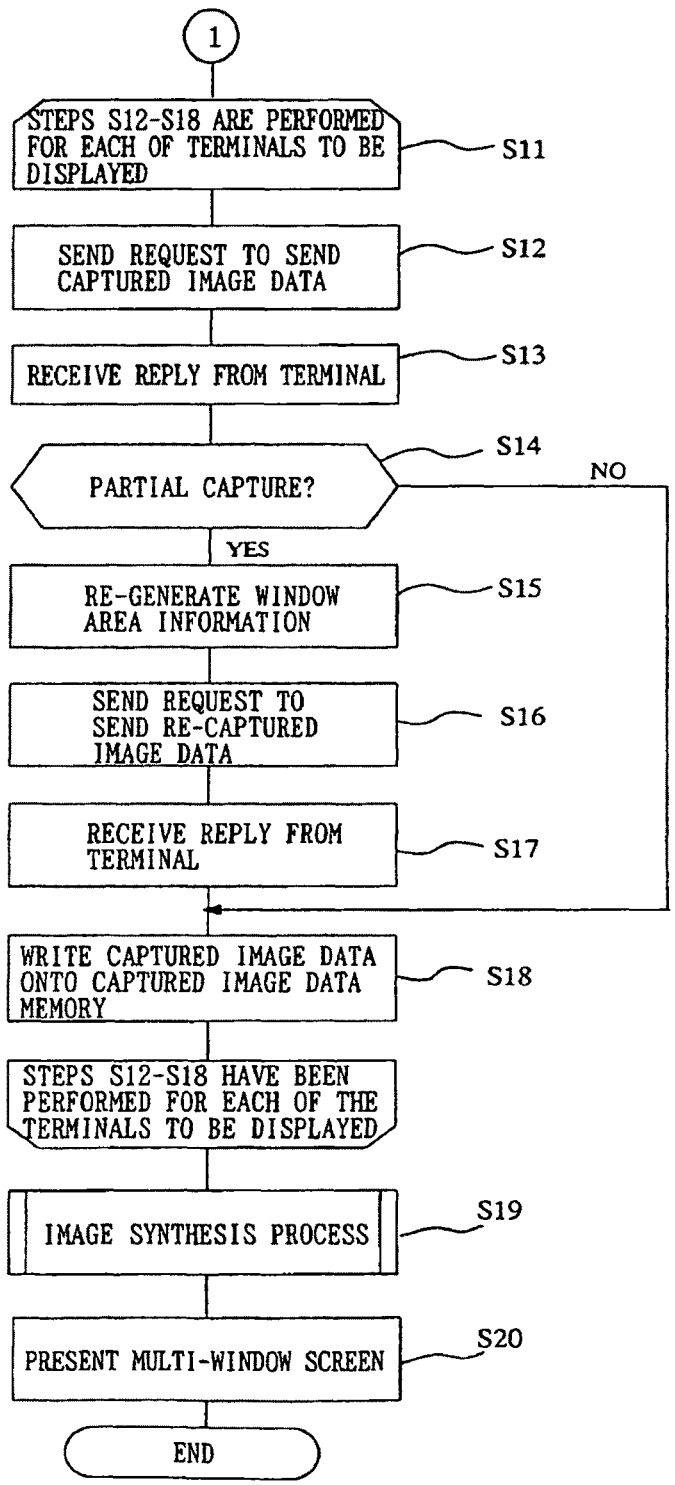
FIG. 7 is a continuation of the flow diagram of FIG. 6.

The operation of the first preferred embodiment of the present invention will now be discussed. FIGS. 6 and 7 are flow diagrams illustrating the operation of the first preferred embodiment.

A predetermined operational input is entered in the input section 23 in the display device 2 in a preliminary step for multi-window screen presentation. Upon detecting the operational input through the user interface 24, the controller 27 broadcasts a request to return a terminal name and an IP address together with the IP address of the display device 2 through the communication unit 28 and the network 3. When each terminal 1 receives the broadcast request to return the terminal name and the IP address, the terminal 1 returns own terminal name and IP address to the display device 2.

The display device 2 receives a reply (the terminal name and the IP address) from each terminal 1 through the communication unit 28, and determines whether each terminal is a connection permitted terminal. Specifically, the display device 2 determines whether the returned terminal name agrees with a terminal name registered in the permitted connection management file 31. If it is determined that the returned terminal name agrees with the registered terminal name, the display device 2 handles the terminal 1 as a connection permitted terminal.

The terminal names and the IP addresses of the terminals 1 determined as connection permitted terminals are successively registered in the connection status management file 33. The connection status management file 33 allows the display device 2 to learn how many terminals 1 are currently connected. Since the determination of whether the connection is permitted or not is based on the terminal name, the system works even if the IP address, provided to the terminal 1 using the DHCP, becomes different each time connection is made.

The display device 2 waits on standby for any request after the above preliminary step is complete. For example, the display screens of the four terminals 1a-1d, out of the terminals 1 operated by conference participants, are presented on a multi-window display screen 50 of the display device 2. As for the resolutions thereof, the terminal 1a has an SXGA resolution (1280×1024 pixels), the terminal 1b has an SVGA resolution (800×600 pixels), the terminal 1c has an XGA resolution (1024×768 pixels), and the terminal 1d has a resolution of 480×640 pixels.

Multi-Window Screen Presentation Function

Figure 8:
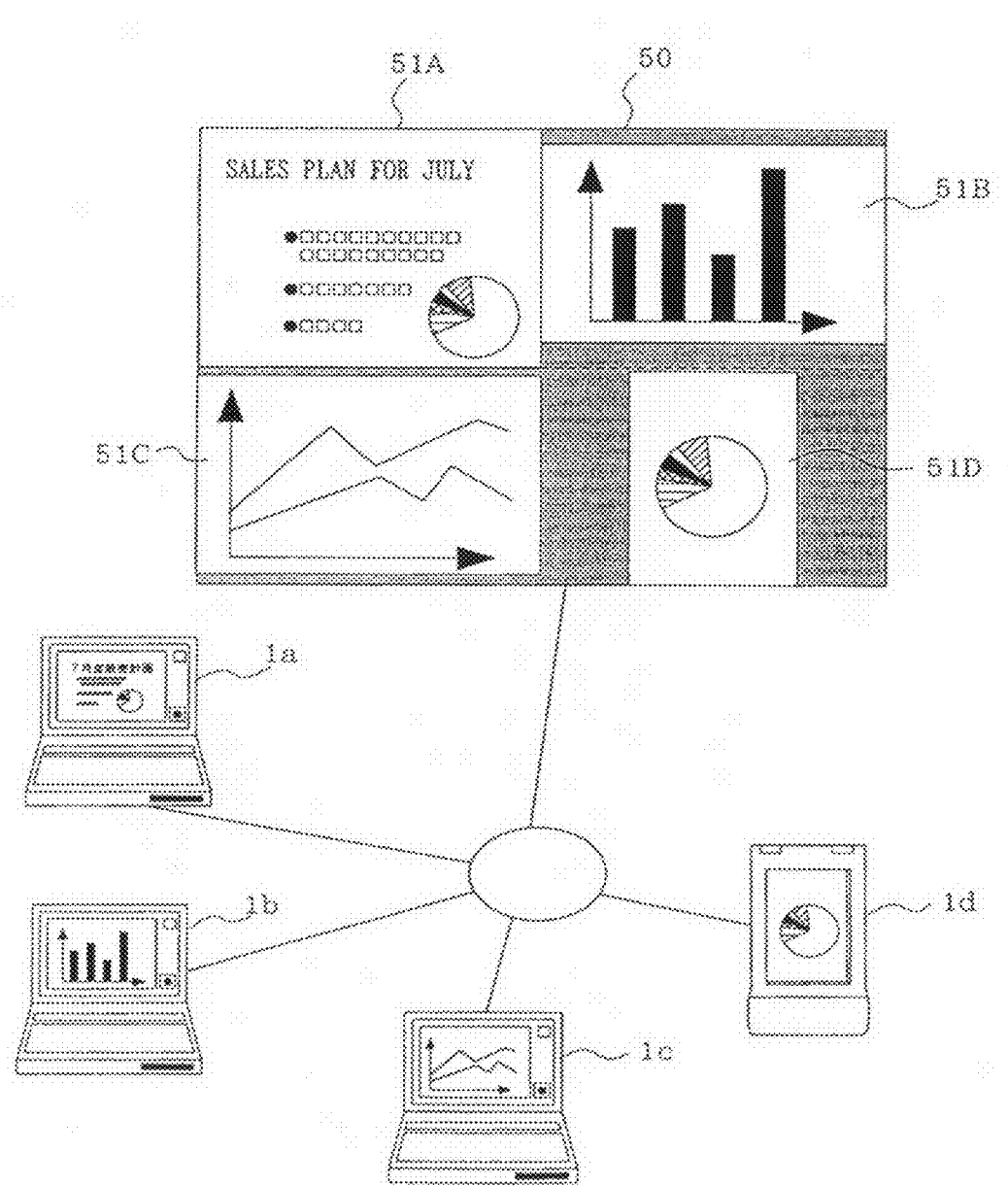
FIG. 8 illustrates the configuration of the display system in which display screens of four terminals 1a-1d are presented on a display screen of a display device.

FIG. 8 illustrates the configuration of the display system in which display screens of four terminals 1a-1d are presented on the display screen of the display device 2.

The user operates the remote controller in the input section 23 to enter an operational input to display the screens of the terminals 1a-1d. Through the user interface 24, the controller 27 is notified of the input information, namely, a request to display the screens of the terminals 1a-1d together with identification information of the terminals 1a-1d (step S1). When the request is placed, the priority order, the partial capture, and the difference capture may also be designated. Here, no particular designation is performed.

Upon receiving the display request, the controller 27 in the display device 2 performs processes in steps S3-S9 for each of the terminals 1a-1d to be displayed (step S2). More specifically, the controller 27 references the permitted connection management file 31 and the permitted display management file 32 according to the terminal name indicated by the identification information contained in the display request, thereby determining whether or not each terminal 1 is permitted for connection and whether or not each terminal 1 is permitted for display (step S3). If it is determined that each terminal 1 is permitted for both connection and display (step S4), the controller 27 requests, through the communication unit 28, each terminal 1 to send the terminal information (the terminal name, the IP address, the screen size, and the color count information) (step S5). The controller 27 receives the terminal information which has been sent in response to the request (step S6), and registers the terminal information in the display status management file 34 (step S7). If the priority order, the partial capture, and the difference capture are designated during the placement of the display request, the priority order, the capture area management flag, and the difference capture management flag are also registered in the registration in step S7.

The controller 27 sends the display status management file 34 and a screen capture start command to the terminal 1 which is permitted for connection and display (step S8). When any terminal 1 is not permitted for connection and display, the controller 27 sends a notification to that effect to the terminal 1 (step S9).

If all four terminals 1a-1d are permitted for connection and display, the terminal information from the terminals 1a-1d is registered in the display status management file 34 in the processes in steps S2-S9. At the same time, the screen capture start command is sent together with the display status management file 34 to each of the terminals 1a-1d through the communication unit 28.

Subsequent to the above processes, the controller 27 notifies the window area information generator 41 in the display control unit 22 of a window area split request. The display device 2 then enters a window area information generation process (step S10). The operation of the terminal 1 having received the screen capture start command will be discussed later. Discussed first is the window area information generation process performed by the window area information generator 41 in response to the window area split request.

Figure 9:
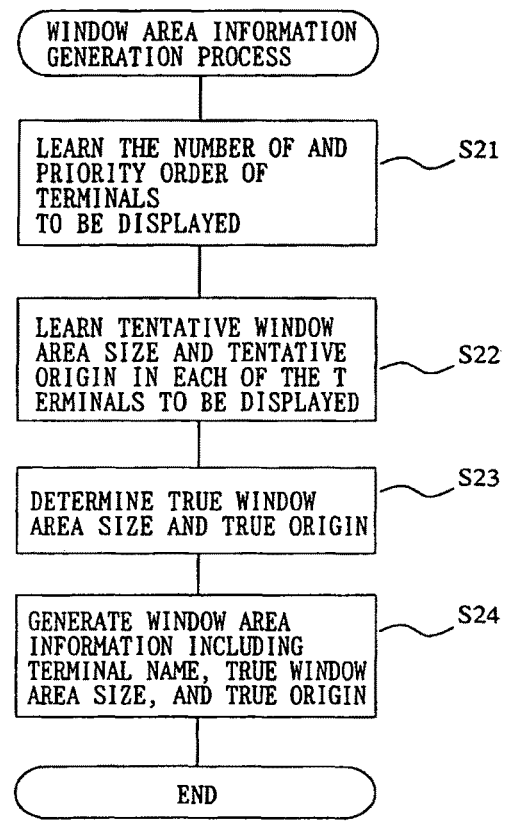
FIG. 9 is a flow diagram illustrating the flow of a window area information generation process.
Figure 10:
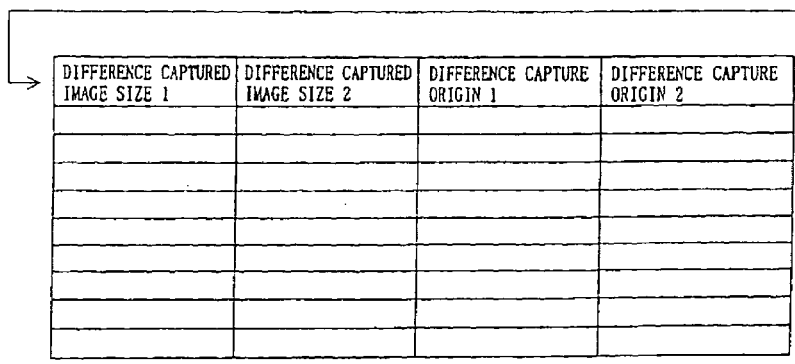
FIG. 10 illustrates a specific structure of the display status management file.

FIG. 9 is a flow diagram illustrating the flow of a window area information generation process. The operation of the window area information generator 41 is specifically discussed on the assumption that the display status management file 34 is constructed as shown in FIG. 10. As shown in FIG. 10, terminal names PC-1, PC-2, PC-3, and PDA-1 correspond to the terminals 1a, 1b, 1c and 1d, respectively.

Upon receiving the window area split request from the controller 27, the window area information generator 41 learns the number of the terminals 1 to be displayed (here, four terminals 1) referencing the display status management file 34. The window area information generator 41 also learns the priority order of each of the terminals 1a-1d (step S21). The window area information generator 41 references the tentative window area setting file 35 according to the number of terminals 1 and the priority order of each of the terminals 1a-1d, and acquires a tentative size and a tentative origin of each tentative window area assigned to each of the terminals 1a, 1b, 1c, and 1d (step S22). As will be clarified later, the adjective "tentative" is used because the area window here assigned to the terminal 1 is updated in a later step to size convert the captured image data.

As shown in FIG. 10, the four terminals 1 are to be displayed here and no priority order is set to all of the four terminals 1. A tentative area setting table in the tentative window area setting file 35 is organized as shown in FIG. 11A. Here, the display screen of the display 21 has a resolution of 1280×1024 (SXGA), and the tentative area setting table shown in FIG. 11A is organized based on this display screen. FIG. 11B shows the tentative window area based on the table window area setting table shown in FIG. 11A.

The priority order shown in FIG. 11A is determined based on the "priority" item in the display status management file 34, and the terminals 1 are first, second, third, and fourth from the high order to the low order. The terminals 1 are assigned the "tentative size" and the "tentative origin" for the tentative window area in the lower table. All the terminals 1a-1d have "none" in the priority order row with no priority order set therefor (see FIG. 10). If no priority order is set, the order of assignment may be a predetermined one, or may be the order of registration to the display status management file 34. In the first preferred embodiment, the terminals 1a, 1b, 1c, and 1d (hereinafter referred to as the terminal names PC-1, PC-2, PC-3, and PDA-1 as appropriate) are assigned tentative window areas 50A, 50B, 50C, and 50D in that order.

The window area information generator 41 further acquires the screen sizes of the PC-1, PC-2, PC-3, and PDA-1 from the display status management file 34 (see FIG. 10), and determines the sizes and origins of true windows respectively assigned thereto based on the acquired screen sizes (step S23).

Figures 12, 13:
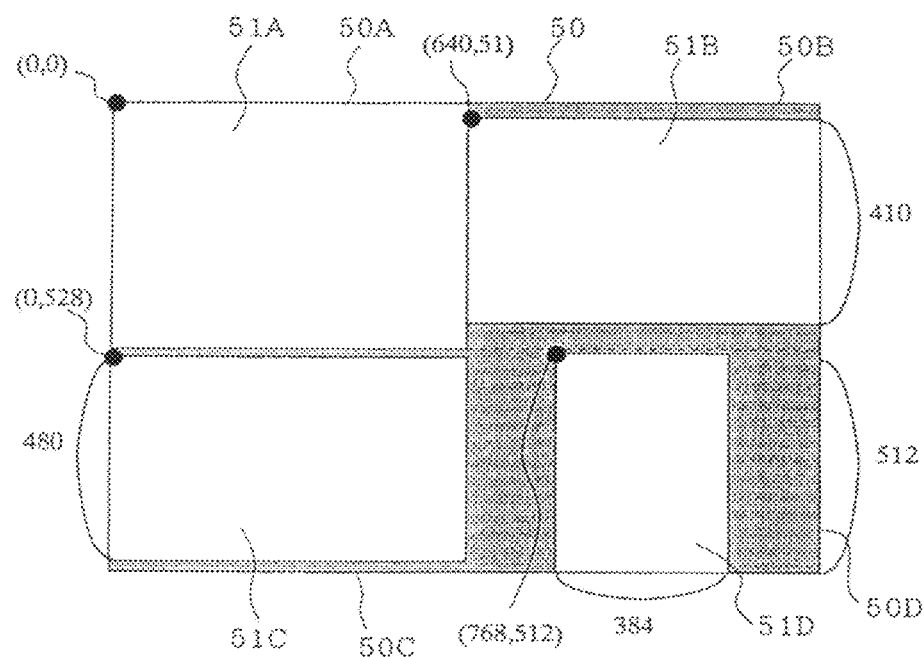
FIG. 12 illustrates a true window area size and a true origin.
FIG. 13 illustrates one example of a window area information file.

FIG. 12 illustrates the true window area size and the true origin. As shown, 51A, 51B, 51C, and 51D represent the true window areas assigned to the PC-1, PC-2, PC-3, and PDA-1, respectively. The captured image data to be displayed on the tentative window area is size converted with the aspect ratio thereof maintained. The true window areas are display areas of the tentative window areas 50A, 50B, 50C, and 50D in which the converted images are respectively displayed with the centers thereof aligned to be centered on the respective tentative window areas. The PC-2 is now specifically discussed in connection with the true window area size to determine the true window area. The screen size of the PC-2 is 1024×768 pixels (see FIG. 10). The image data of this size is contracted with the aspect ratio thereof (namely, the aspect ratio of the display screen of the display 11) maintained so that the image data is displayed within the window area 50B having the size of 640×512 pixels assigned to the PC-2. The contracted size is thus the true window area size. The true origin is used to place the window of that size at the center of the window area 50B as shown in FIG. 12, and is represented in pixel coordinates at the top left corner of the window (the absolute coordinates with respect to the entire display screen).

The window area information generator 41 determines the above-referenced true window area sizes and true origins for the PC-1, PC-2, PC-3, and PDA-1, and generates window area information containing the terminal name item, the window area item, and the origin item as shown in FIG. 13, and then stores the window area information in the data storage 26 as the window area information file 36 (step S24). The window area information generation process thus ends. The window area information file 36 is tagged with processing date (May 21, 2002, 17:00:32, for example).

Returning to FIG. 6, the controller 27 in the display device 2 performs processes in steps S12-S14 to each of the terminals 1a, 1b, 1c, and 1d to be displayed (step S11) when the window area information generator 41 completes the window area information generation process (step S10). More specifically, the controller 27 places a request to send the captured image data (step S12). The sent request to send the captured image data includes the true window area size assigned to the terminal 1 to which the request is sent, and the display color count of the display 21 of the display device 2 stored in the display specification management file 30. For example, the request to send the captured image data including the true window area size of 640×512 (see FIG. 13) and the display color count of 167,777,216 of the display device 2 is sent to the terminal 1a (PC-1).

Upon receiving the capture start command sent from the display device 2 in step S8, the terminal 1 starts capturing the screen thereof. If the screen capture performed by the terminal 1 is a full-screen capture, the terminal 1 sends, to the display device 2, the captured image data which has been subjected to the size conversion process and the color conversion process in accordance with the true window area size and the display color count contained in the request to send the captured image data, in response to the request to send the captured image data sent in step S12. If the screen capture performed by the terminal 1 is a partial-screen capture, an image size of the partial-captured image is sent to the display device 2.

The display device 2 receives the reply from the terminal 1 (step S13). If the rely is the captured image data, the display device 2 determines that the screen capture performed by the terminal 1 is a full-screen capture (step S14), and the received captured image data is written onto the captured image data memory 37 (step S18).

If the reply from the terminal 1 received in step S13 is the image size, the controller 27 determines the screen capture performed by the terminal 1 is a partial-screen capture (step S14). The captured image size in the display status management file 34 is updated with the received image size. The controller 27 regenerates the window area information (the true window area size and the true origin) based on the received image size (step S15). The controller 27 updates the required portion of the window area information file 36, and sends a request to send recaptured image data responsive to the regenerated true window area size and the display color count of the display 21 (step S16). The terminal 1 receives the request to send the recaptured image data. The terminal 1 returns, to the display device 2, the captured image data which has been subjected to the size conversion process and the color conversion process in accordance with the true window area size and the display color count of the display 21, contained in the request to send the recaptured image data. The display device 2 receives the reply from the terminal 1 (step S17), and writes the reply onto the captured image data memory 37 (step S18).

The above process is performed for each of the terminals 1a-1d. When the captured image data is received from all terminals 1a-1d, the controller 27 sends an image synthesis command to the image synthesizer 42. The display device 2 enters an image synthesis process (step S19).

Upon receiving the image synthesis command, the image synthesizer 42 identifies locations of synthesis of the size-converted captured image data and the color-converted captured image data stored in the captured image data memory 37 in accordance with the true origin of the window area information in the window area information file 36, and synthesizes the captured image data into a single screen image data, thereby generating the synthesized image data. The synthesized image data is then output to the image processor 43.

The image processor 43 converts the synthesized data from the image synthesizer 42 in display image data having a scanning frequency of the display 21. The display image data is then output to the display 21. As shown in FIG. 8, a multi-window screen is thus present on the display screen 50 in which the captured image data (display screen) of the terminals 1a, 1b, 1c, and 1d is presented on the true window areas (hereinafter also referred to as window screens) of 51A, 51B, 510, and 51D (step S20).

The operation of the terminal 1 having received the capture start command and the display status management file 34 from the display device 2 is discussed below.

Figure 14:
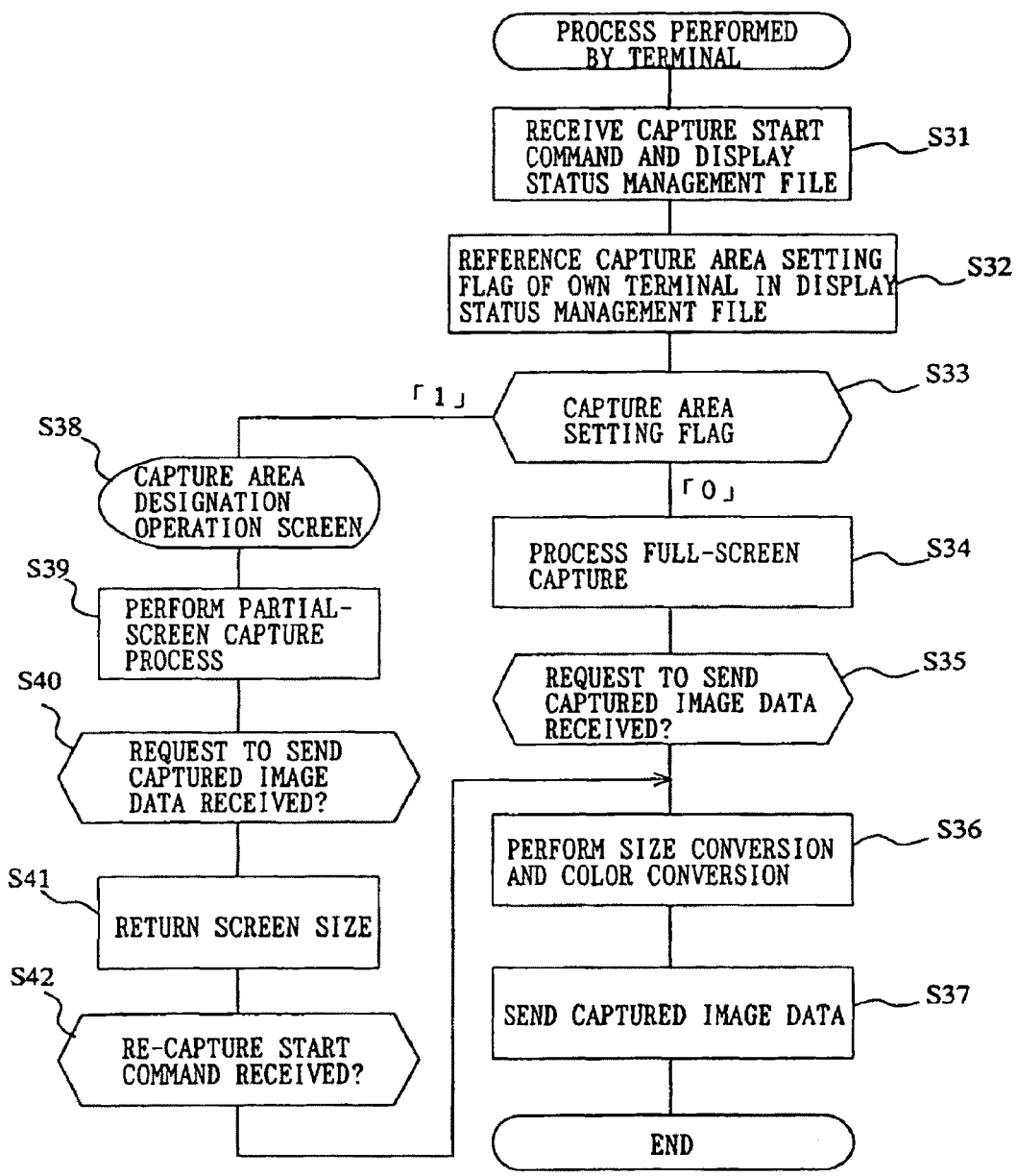
FIG. 14 is a flow diagram of an operation of the terminal which has received a capture start command and a display status management file from the display device of the first preferred embodiment.

FIG. 14 is a flow diagram of the operation of the terminal 1 which has received the capture start command and the display status management file 34 from the display device 2. The terminal 1 is here 1a (PC-1).

The controller 16 in the terminal 1a receives, through the communication unit 17, the capture start command and the display status management file 34 sent from the display device 2 (step S31). The controller 16 references the capture area management flag in the terminal 1a in the display status management file 34 (step S32). Since the capture area setting flag is "0" (step S33), the full-screen capture is determined to be activated. The controller 16 sends a full-screen capture command to the screen capture processor 19. In response to the full-screen capture command, the screen capture processor 19 stores the content of the video memory 12 (i.e., the content currently displayed on the display screen of the display 11) in the storage 15 in a bit-map format (a full-screen capture process) (step S34).

When the terminal 1a receives, from the display device 2, the request to send the captured image data (step S35), the terminal 1a performs the size conversion on the captured image data acquired in the full-screen capture process in step S34 in accordance with the true window area size contained in the request to send the captured image data while performs the color conversion process on the captured image data in accordance with the display color count contained in the request to send the captured image data (step S36). Since the terminal 1a (PC-1) has a screen size of 1280×1024 pixels (see FIG. 10), the captured image data of this size is converted (in a contraction process) into data of size as large as the assigned window area size of 640×512 (see FIG. 13). No color conversion is performed because the display 11 has the same color count of 167,777,216 as the display device 2. If the display 11 has a color count larger than that of the display device 2, the color count is down-converted to match that of the display device 2. The captured image data, size converted and color converted in this way, is sent through the communication unit 17 (step S37).

If the capture area setting flag is determined to be "1" in step S33, a partial capture is determined to be activated. A capture area designation screen indicating a message saying "designate a capture area" is presented on the display 11 (step S38), and a partial capture command is sent to the screen capture processor 19. When the user, who reads the message on the capture area designation screen, selects a window or encloses a desired area using the input section 13, the screen capture processor 19 recognizes the user operation through the user interface 14. The image data on the video memory 12 corresponding to the designated area and the image size is stored in the storage 15 (a partial capture process) (step S39).

Upon receiving the request to send the captured image data from the display device 2 (step S40), the terminal 1a returns the size of the partial captured image captured in the partial capture process in step S39 (step S41). The reply is received by the display device 2 as already discussed. The display device 2 regenerates the true window area size based on the image size in the partial capture process, and sends, to the terminal 1a, the request to send the recaptured image data containing the regenerated true window area size and the display color count of the display 21 of the display device 2. Upon receiving the request, the terminal 1a performs the size conversion process on the partial captured image data stored in the storage 15 in step S39, based on the true window area size contained in the request to send the captured image data, while performing the color conversion process on the partial captured image data in accordance with the color count contained in the request to send the captured image data (step S36). The terminal 1a then sends the captured image data, which has been size converted and color converted in this way, to the display device 2 through the communication unit 17 (step S37).

The above-referenced process is similarly performed on each of the remaining terminals 1b, 1c, and 1d in addition to the terminal 1a. As a result, the display device 2 receives, from each of the terminals 1a, 1b, 1c, and 1d, the captured image data which has been size converted into the true window area size assigned thereto, and which has been color converted to the display color count of the display 21 of the display device 2.

Each terminal 1 receives the display status management file 34 from the display device 2. The display status management file 34 is used to check the status of the capture area setting flag of own terminal 1. Furthermore, the content of the file may be displayed on the display 11 by performing a predetermined operation on the input section 13. The permitted connection management file 31, the permitted display management file 32, and the connection status management file 33 may also be acquired from the display device 2 as necessary to be presented on the display 11. In this way, the user may learn what terminals are displayed other than own terminal operated by the user himself and the range of authority granted to own terminal 1.

Expansion Display Function

An expansion display function for expanding any one of a plurality of currently presented windows is discussed below. The expansion display function is performed by updating the priority order in the above-referenced arrangement.

Figure 15:
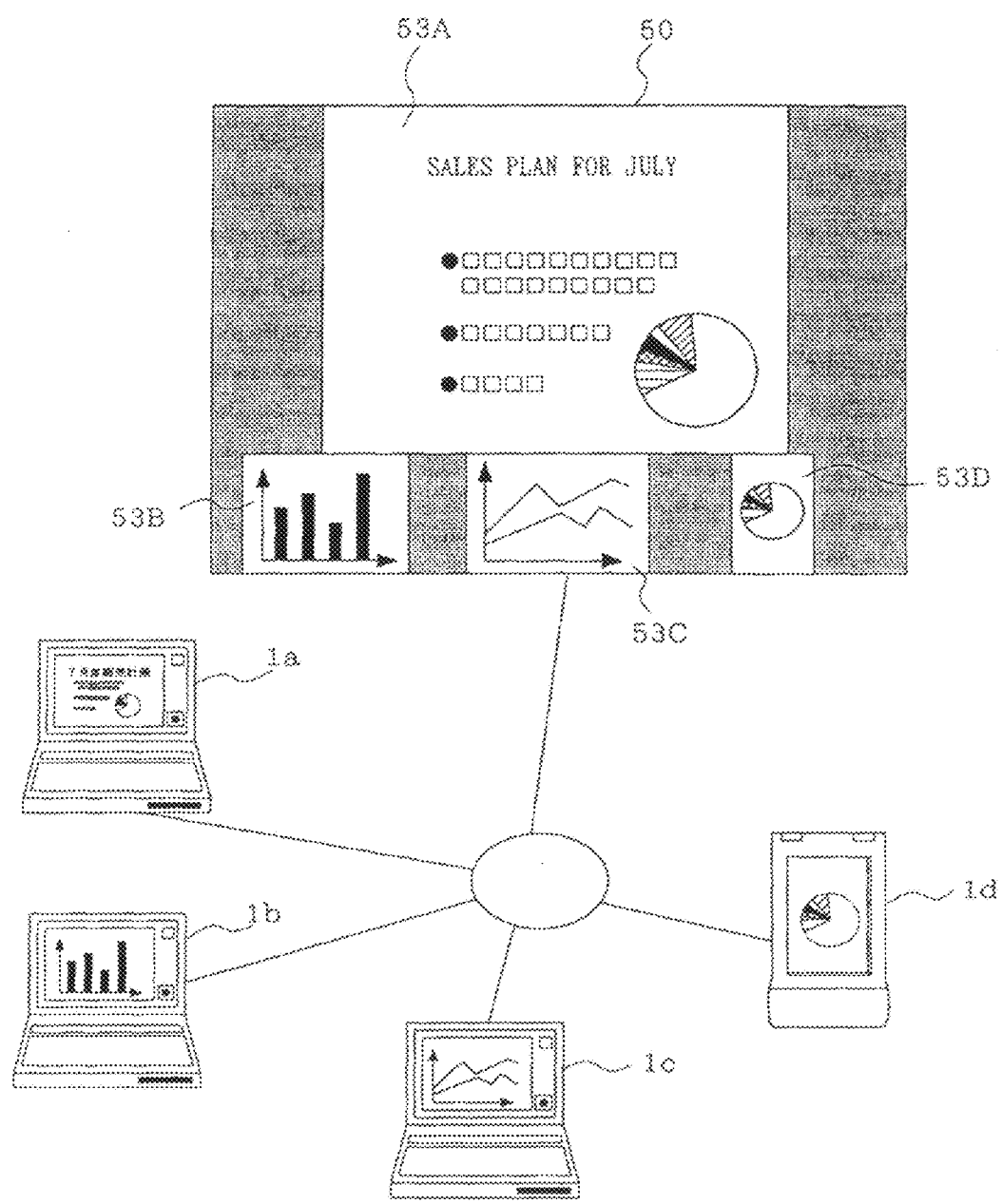
FIG. 15 diagrammatically illustrates the display system to explain an expansion display function.

FIG. 15 diagrammatically illustrates the display system to explain the expansion display function. The screen of the terminal 1a is expanded by heightening the priority order of the terminal 1a.

The screen of the terminal 1a is designated by operating the remote controller. If the terminal 1a is assigned any key in the remote controller, the user designates the terminal 1a by pressing that key. If no particular key is assigned, the user may operate the remote controller to select the terminal 1a on a menu screen on the display 21, or may click the screen of the terminal 1a with a pointer on the display screen using the remote controller.

Designation information input in this way, i.e., an expansion display request containing the identification information of the terminal 1a, is sent to the controller 27 through the user interface 24. The controller 27 identifies the terminal 1a based on the identification information contained in the expansion display request. The controller 27 sets the priority of the terminal 1a (PC-1) in the display status management file 34 to be "highest", and sends a window area split request to the window area information generator 41.

The window area information generator 41 generates the window area information file 36 as already described. The tentative window area setting table, which is referenced in the generation of the window area information file 36, is organized as illustrated in FIG. 16A. FIG. 16B shows tentative window areas based on the tentative window area setting table. The priority order illustrated in FIG. 16B is determined based on the priority order in the display status management file 34. The priority order of the terminal 1a is higher than those of the remaining terminals 1b, 1c, and 1d. The terminal 1a is thus assigned the tentative window area 52A (the window area for the first terminal) having the first priority in FIG. 16B. The assignment of the window areas to the remaining terminals 1b, 1c, and 1d having no priority order set therefor is arbitrary. For example, the terminals 1b, 1c, and 1d are now assigned tentative window areas 52B, 52C, and 52D, respectively. As already described, the true window areas to be assigned to the terminals 1b, 1c, and 1d are determined.

Figures 17, 18:
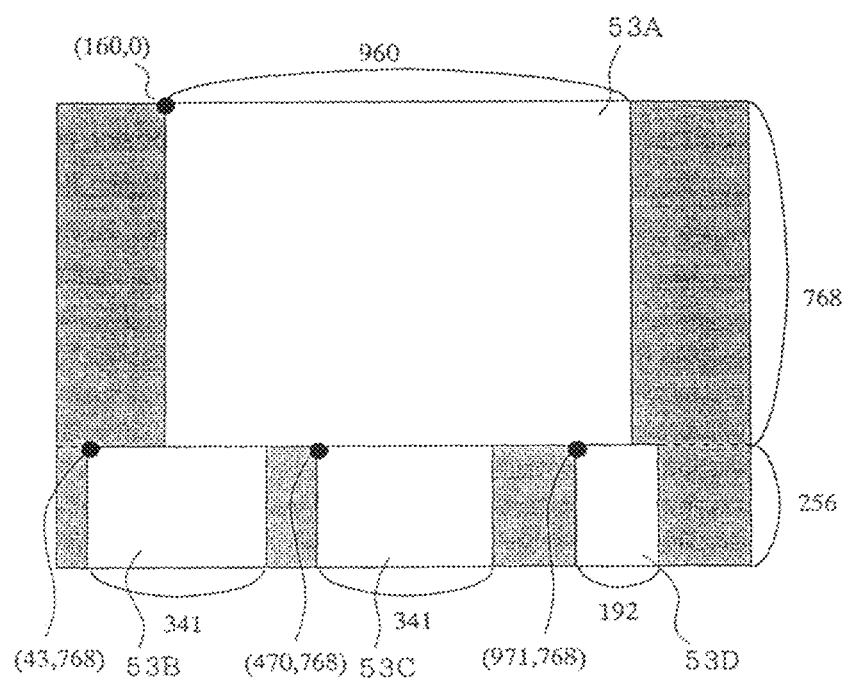
FIG. 17 illustrates a true window area with the priority order modified.
FIG. 18 illustrates a window area information file that is produced when the priority order is modified.

FIG. 17 illustrates the true window areas. The terminals 1a, 1b, 1c, and 1d are assigned the true window areas 53A, 53B, 53C, and 53D, respectively. The window area information file 36 is then organized as illustrated in FIG. 18.

As already described, the captured image data (display screen) of the terminals 1b, 1c, and 1d appears on the true window areas 53A, 53B, 53C, and 53D, respectively. The designated window 51A is shown in an expanded state thereof on the multi-window screen 50.

Function to Switch to Single-Window Screen

Figure 19:
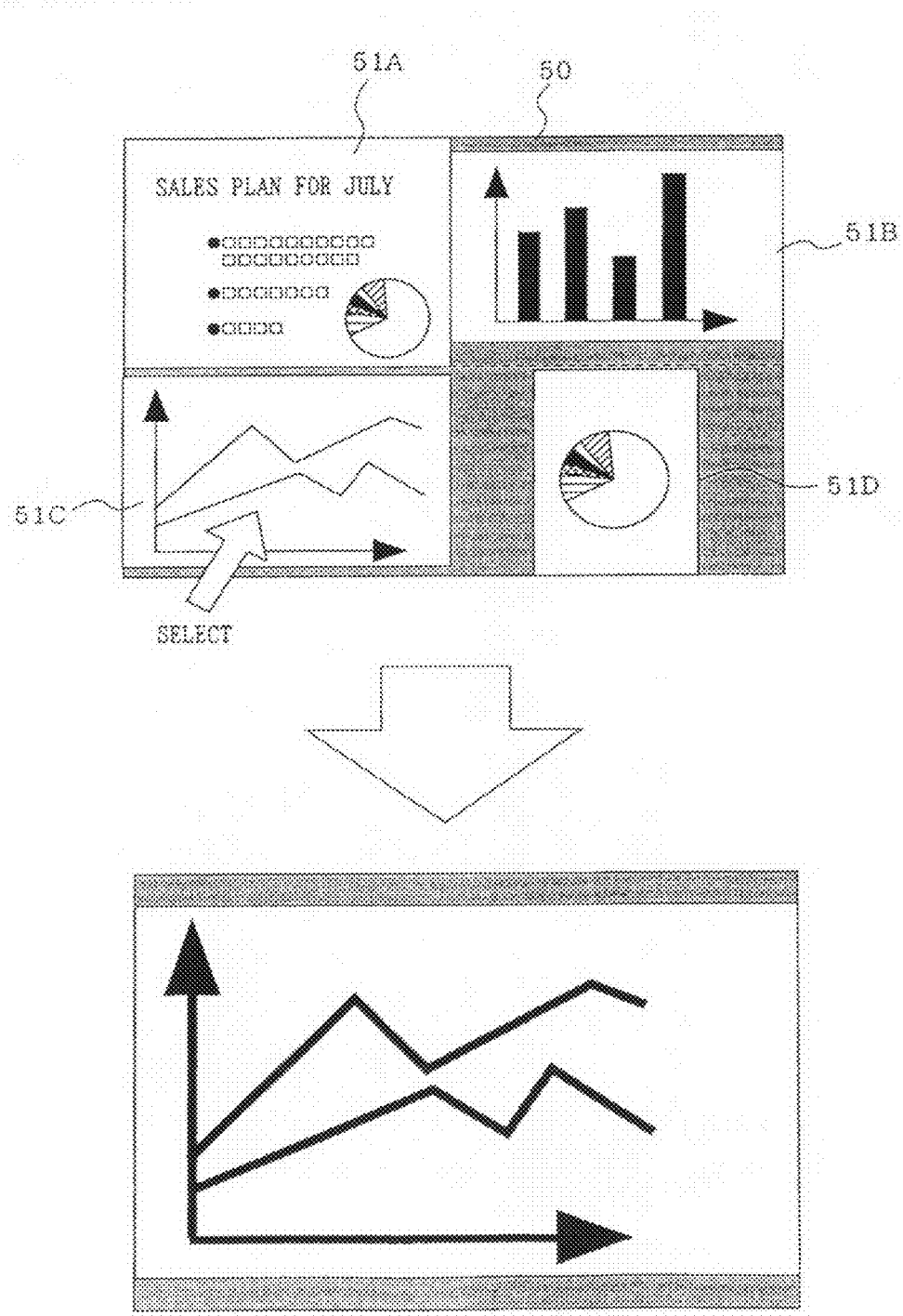
FIG. 19 diagrammatically illustrates a single-window screen presentation function.

One of the plurality of multi windows is shown on a single-window screen as shown in FIG. 19. The user may operate the remote controller to enter an operational input for the function to switch to a single-window screen. More specifically, the controller 27 is notified of the input information, namely, the single-window display request containing the identification information of the terminal 1c corresponding to the window 51C to be displayed on the single-window screen. The controller 27 identifies the terminal 1c based on the identification information contained in the single-window display request. The controller 27 sets the priority order item of the terminal 1c (PC-3) in the display status management file 34 to be the highest, thereby sending a window area split request to the window area information generator 41.

As a result, the multi-window screen is replaced with the single-window screen as shown in FIG. 19. The user may return to the multi-window screen by performing a predetermined operation on the remote controller to set the priority order to "none".

The switching to the single-window screen allows the user to recognize details, which are not visible in the contracted scale on the window. The ease of use is assured because the predetermined operation quickly returns the screen to the multi-window screen.

Insertion Function

Figure 20:
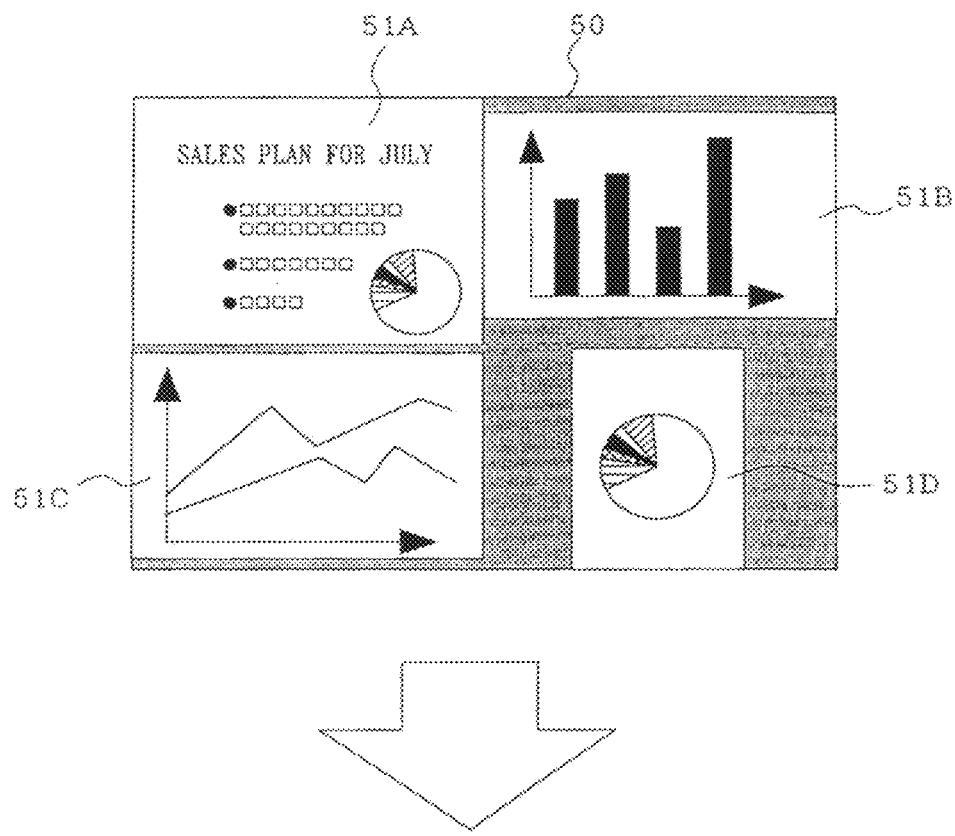
FIG. 20 diagrammatically illustrates an insertion function.
Figure 20:
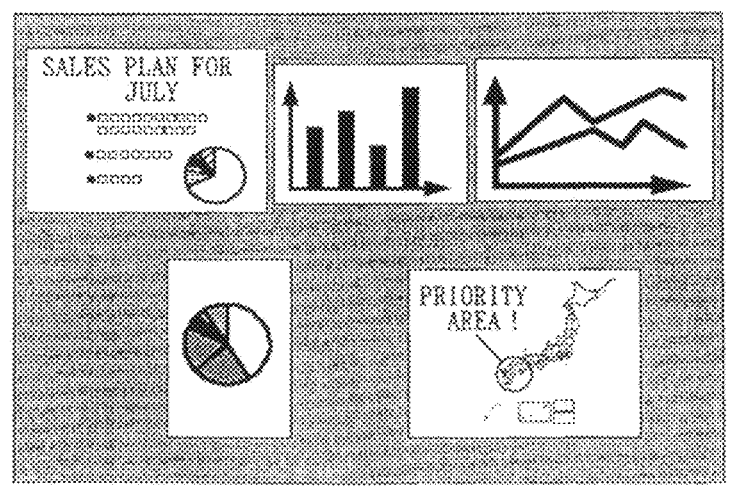

As shown in FIG. 20, a new window may be inserted into a currently presented multi-window screen. Such an insertion corresponds to a display request subsequent to the display of a multi-window screen. The screen insertion is thus performed in the same process as in the display request process.

Erase Function

Figure 21:
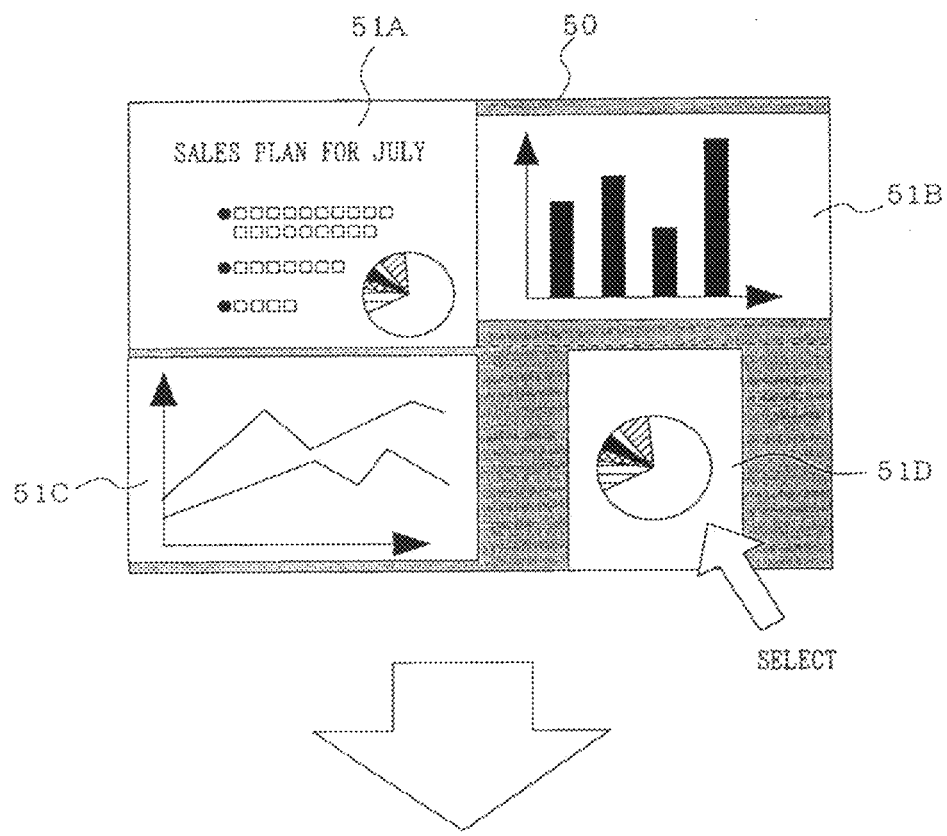
FIG. 21 diagrammatically illustrates a window erase function.
Figure 21:
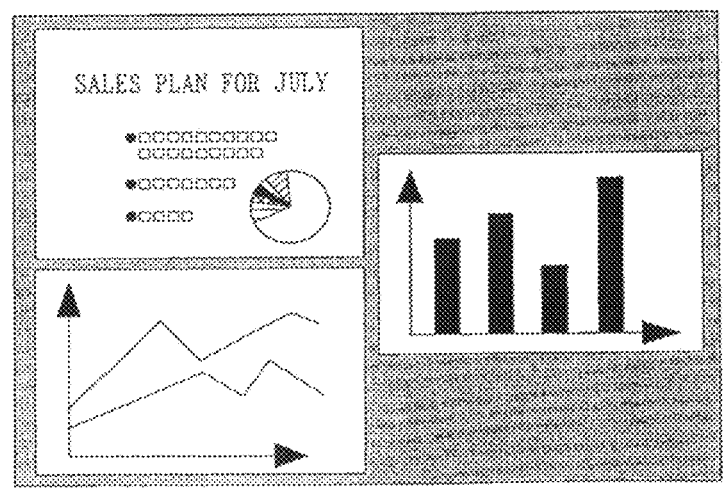

As shown in FIG. 21, one of the plurality of currently presented windows may be erased. The user operates the remote controller to enter an operational input for the erase function. More specifically, the input information, namely, an erase request containing the identification information of the terminal 1d corresponding to the window 51D to be erased is sent to the controller 27 through the user interface 24. The controller 27 identifies the terminal 1d based on the identification information contained in the erase request. The controller 27 deletes the terminal information of the terminal 1d from the display status management file 34, and sends a window area split request to the window area information generator 41. The subsequent process remains identical to the one already discussed. The window 50D designated for erasure is erased as shown in FIG. 21. The multi-window screen is reorganized so that a plurality of windows corresponding to the number of terminals subsequent to the erasure are presented. Alternatively, the window 51D designated for erasure may be merely erased.

The first preferred embodiment of the present invention provides the display system 100 having the multi-window screen presentation function in which the screens of the plurality of terminals 1 connected to the network are presented on the plurality of windows on the display screen of the display device 2. The processes required to perform the multi-window screen presentation function, i.e., the size conversion process and the color conversion process, are performed on the terminal 1. This arrangement dramatically reduces the workload on the display device 2, in comparison with the case in which the display device 2 performs the same processes on the captured image data sent from the terminal 1. Since the size conversion process and the color conversion process are performed by the terminal 1, the effect of an increase in the number of terminals 1 on processes to be performed by the display device 2 is minimized in the display system 100.

The workload on the network 3 is also reduced because the terminal 1 performs the size conversion process on the captured image data before the transmission of the captured image data to the display device 2 over the network 3.

The ease of use of the system 100 is assured because the expansion display function, the switching function to the single-window screen, the insertion function, and the erase function are available in addition to the multi-window screen presentation function.

The captured image data acquired in the terminal 1 is presented on the corresponding window on the display screen of the display device with the aspect ratio thereof maintained. The display screen of the display device is thus free from discordance.

Rather than updating the display screen each time the conference participant (the user) places the display request through the input section 23, the display device 2 itself updates the display screen thereof every three seconds, for example. In this case, the controller 27 in the display device 2 controls timings, thereby performing subsequent processes as described above at regular intervals. The constantly updated display screen of each terminal 1 is viewed on the display of the display device 2.

Difference Capture Function

The full-screen capture method and the partial-screen capture method have been described. The display system 100 also provides a method in which a change in the display screen on the terminal 1 is detected and image data obtained by capturing the change only is sent.

The user operates the remote controller of the input section 23 to enter an operational input to perform a difference capture on each of the terminals 1a-1d. More specifically, the difference capture management flag in the display status management file 34 is set to be "1".

For a first cycle of process immediately subsequent to the setting of the difference capture management flag to "1", steps S1-S20 are performed as described above to present the multi-window screen.

After the completion of the multi-window presentation, the controller 27 in the display device 2 sends a difference capture start command together with the display status management file 34 to the terminal 1 with the difference capture management flag thereof set to "1" through the communication unit 28 and the network 3.

The operation of the terminal 1 having received the difference capture start command and the display status management file 34 from the display device 2 will be discussed below.

Figure 22:
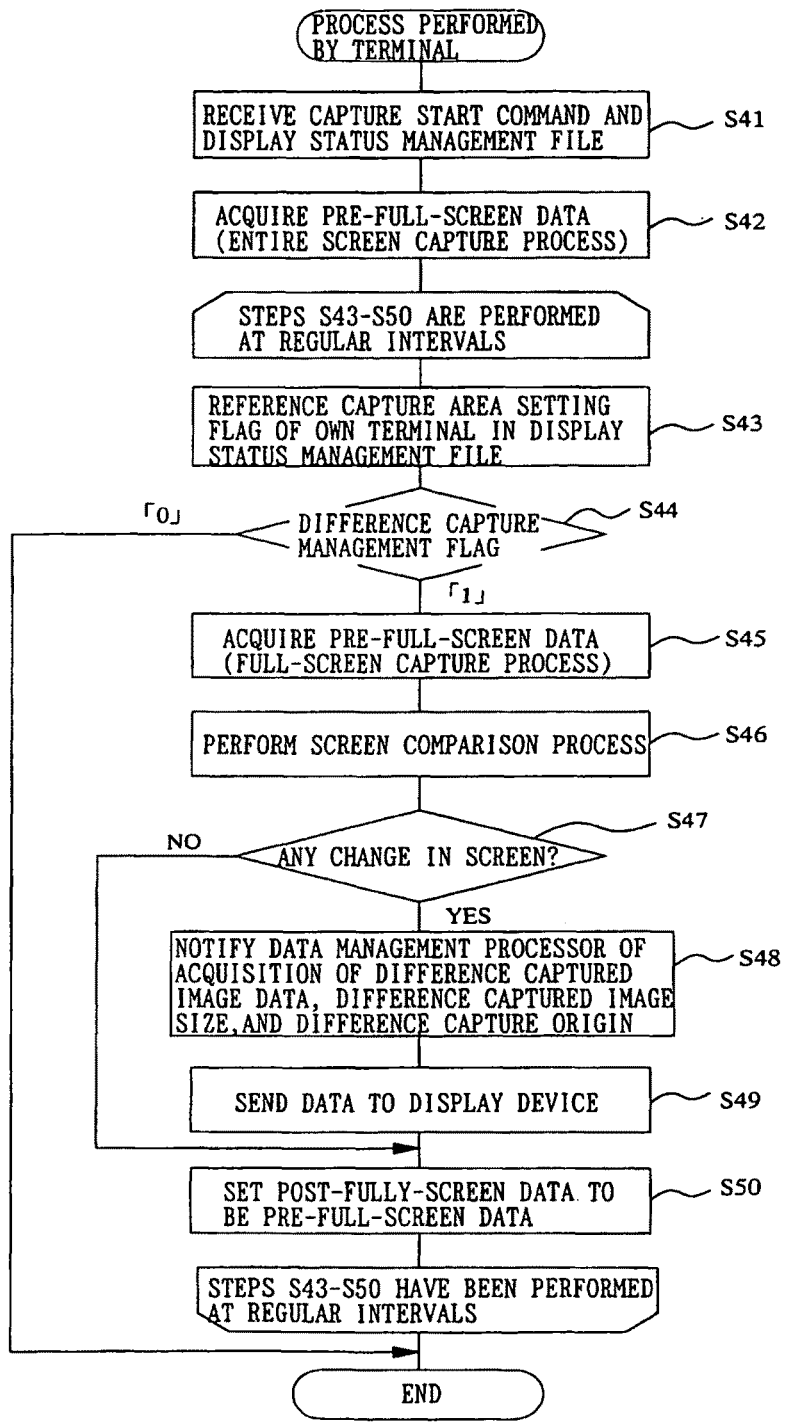
FIG. 22 is a flow diagram illustrating an operation of terminal which has received a difference capture start command and a display status management file from the display device.

FIG. 22 is a flow diagram illustrating the operation of terminal which has received the difference capture start command and the display status management file 34 from the display device 2. Here, the terminal of interest is the terminal 1a (PC-1).

The data management processor 18 in the terminal 1a receives, through the communication unit 17, the difference capture start command and the display status management file 34 sent by the display device 2 (step S41). The terminal 1a thus performs a subsequent full-screen capture process. More specifically, the screen capture processor 19 stores the content of the video memory 12 in the storage 15 (step S42). The image data obtained here is referred to as pre-full-screen data.

The screen comparison processor 20 references the difference capture management flag in the display status management file 34, received by the data management processor 18, at any regular intervals set (once every 0.5 second, for example) (step S43). If the difference capture management flag is "1" (step S44), a subsequent difference capture operation is performed.

To quit the difference capture operation, the user simply sets the difference capture management flag to "0" in the same way as the display status management file 34 is modified. The screen comparison processor 20 determines whether or not the capture operation is suspended, by referencing the difference capture management flag.

After performing the full-screen capture process, the screen capture processor 19 stores the content of the video memory 12 in the storage 15 (step S45). The image data obtained here is referred to as post-full-screen data. The screen comparison processor 20 in the controller 16 compares the pre-full-screen data with the post-full-screen data (step S46).

Figure 23:
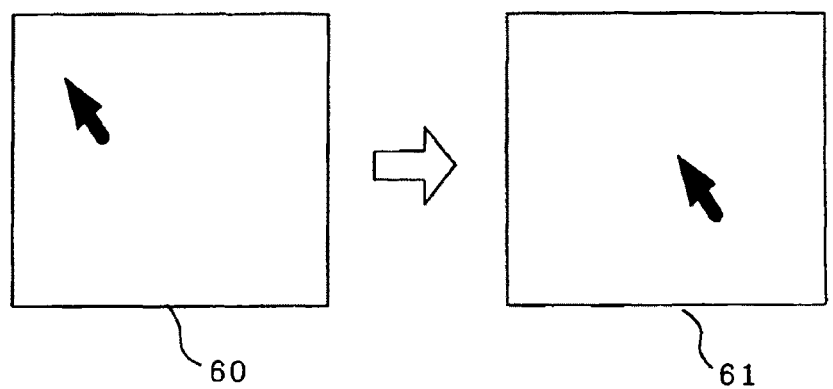
FIG. 23 illustrates a screen comparison process wherein a mouse pointer is moved.
Figure 24:
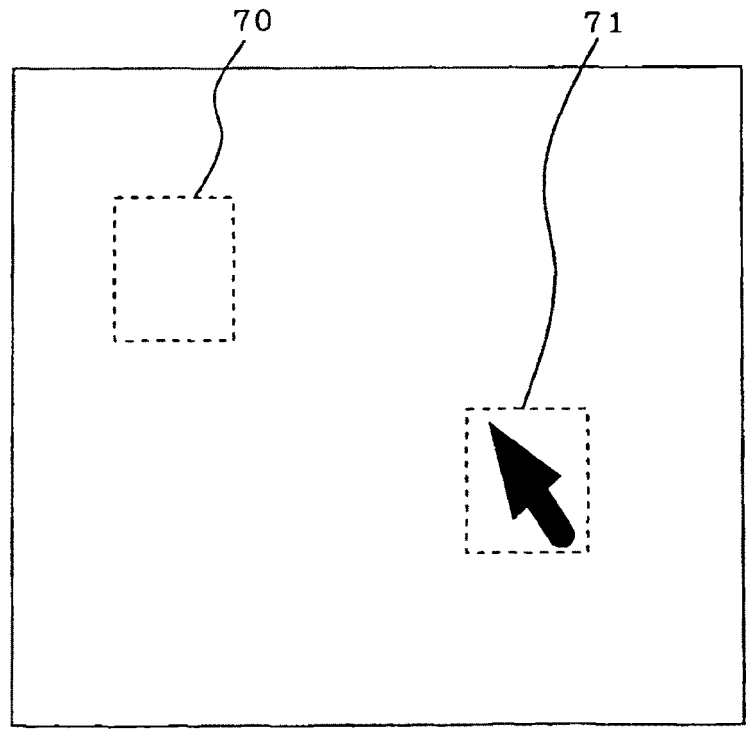
FIG. 24 illustrates the screen comparison process of FIG. 23.

A screen comparison process is discussed in which a mouse pointer is moved (see FIG. 23). The mouse pointer changes the position thereof from pre-full-screen data 60 and post-full-screen data 61. As shown in FIG. 24, two areas 70 and 71 are recognized as being changed. The screen comparison processor 20 detects a change. If it is determined that there has been a change in the screen (step S47), the screen comparison processor 20 acquires image data of an area that has undergone a change, a size of the image data (the number of pixels in vertical and horizontal directions), and coordinates of an origin of the image data (absolute coordinates within the area defined by the captured image size in the display status management file 34).

In this case, the screen comparison processor 20 acquires, with respect to the area 70, captured image data of the area 70 (hereinafter referred to difference captured image data 1), a difference captured image size 1, and a difference capture origin 1, and with respect to the area 71, captured image data of the area 71 (hereinafter referred to difference captured image data 2), a difference captured image size 2, and a difference capture origin 2. The screen comparison processor 20 then stores these pieces of information in the storage 15 while notifying the data management processor 18 that the difference captured image data has been acquired (step S48). The difference captured image size 1, the difference captured image size 2, the difference capture origin 1, and the difference capture origin 2 are written on the respective portions thereof in the display status management file 34.

The data management processor 18 sends these pieces of data to the display device 2 through the communication unit 17 and the network 3 (step S49). The difference capture function is different from the full-screen capture and the partial-screen capture. More specifically, the difference capture function is performed not in response to the request to send received from the display device 2 but in response to the change in the screen detected by the screen comparison processor 20. The transmission operation of the captured image data is then performed.

The post-full-screen data is set to be pre-full-screen data for a subsequent screen comparison process (step S50).

The display device 2 then receives the difference captured image data 1, the difference captured image data 2, and the display status management file 34 from the terminal 1a. The operation of the display device 2 subsequent to the reception of these pieces of data will now be discussed.

Upon receiving the difference captured image data 1, the difference captured image data 2, and the display status management file 34 from the terminal 1a at the communication unit 28, the controller 27 transfers an image synthesis command to the image synthesizer 42. The display device 2 enters the image synthesis process in the difference capture function.

Upon receiving the image synthesis command, the image synthesizer 42 rewrites portions of the captured image data stored in the captured image data memory 37 corresponding to the difference captured image data 1 and the difference captured image data 2, based on the window area information file 36 corresponding to the image displayed on the display 21 and the display status management file 34 (the difference captured image size 1, the difference captured image size 2, the difference capture origin 1, and the difference capture origin 2) received from the terminal 1a. The process subsequent to this operation are identical to those in steps S19 and S20.

The amount of image data transmitted over the network 3 is smaller in the difference capture process than in the full-screen capture (or the partial-screen capture) process. The workload on the network 3 is thus reduced. The user constantly monitors an updated image of the terminal 1.

The above description of the difference capture process is based on the assumption that a dedicated program installed on the terminal 1 is used to capture the screen. If a driver for directly detecting a difference in the content of the video memory is available on the operating system (OS), such a driver may be used.

The image data may be exchanged in a compression standard format (such as JPEG) between the terminal 1 and the display device 2 to reduce the workload on the network 3.

In the above description, a variety of requests such as the display request and the single-window screen display request is performed by operating the input section 23 on the display device 2. In other words, the display device 2 has the initiative in the organization of the screen. Alternatively, each terminal 1 may have the initiative. The conference participant (the user) enters a desired operational input by operating the input section 13 on own terminal 1. The input information is transferred to the controller 16 through the user interface 14. The controller 16 in turn sends the request, including the terminal name and the IP address of own terminal 1, responsive to the input information to the display device 2 via the communication unit 17 and the network 3. The request is received by the communication unit 28 in the display device 2 through the network 3. The request is then transferred to the controller 27. The operation subsequent thereto remains the same as those already discussed. In this way, a variety of requests may be placed using the terminal 1.

The terminal 1 may designate the capture area by containing information, which designates the full-screen capture or the partial-screen capture, in the variety of requests.

The priority order may be designated by the user as necessary as described above. Alternatively, a plurality of terminals 1 which are scheduled to be connected to the display device 2 may be assigned beforehand priority order. If the terminals 1 are assigned beforehand the priority order, the priority assigned to each terminal 1 is automatically set in the priority item of the display status management file 34 when the terminal information is registered in the display status management file 34.

In the above description, the tentative window area is determined based on the tentative window area setting file 35. Alternatively, the tentative window area may be determined through calculation each time.

In the partial capture, the terminal 1 returns the image size to the display device 2. The display device 2 regenerates the true window area in response to the received image size. The regeneration of the true window area may be performed by the terminal 1.

Second Embodiment

FIG. 1 illustrates a network of a display system 100 including a network interactive display device 2 in accordance with preferred embodiments of the present invention.

The display system 100 includes a plurality of terminals (only four terminals 1a, 1b, 1c, and 1d are shown in FIG. 1), and the network interactive display device 2 (a projector here) having a multi-window screen presentation function as one of major functions of the present invention. The plurality of terminals 1 are respectively connected to the network interactive display device 2 through a network 3 in a two-way communication based on the TCP/IP protocol. A unique name is provided beforehand to each terminal 1 (hereinafter referred to as a terminal name). The network 3 may be any of a LAN (Local Area Network), a radio LAN, and a near-field communication radio LAN such as Bluetooth (Tradename of Bluetooth SIG Inc., U.S.A.).

The display system 100 allows screens presented on the plurality of terminals 1 to be concurrently presented on a multi-window display screen of the network interactive display device 2. Such a system 100 is useful in a conference or a presentation. The terminal 1 and the network interactive display device 2 will now be discussed in detail.

Figure 26:
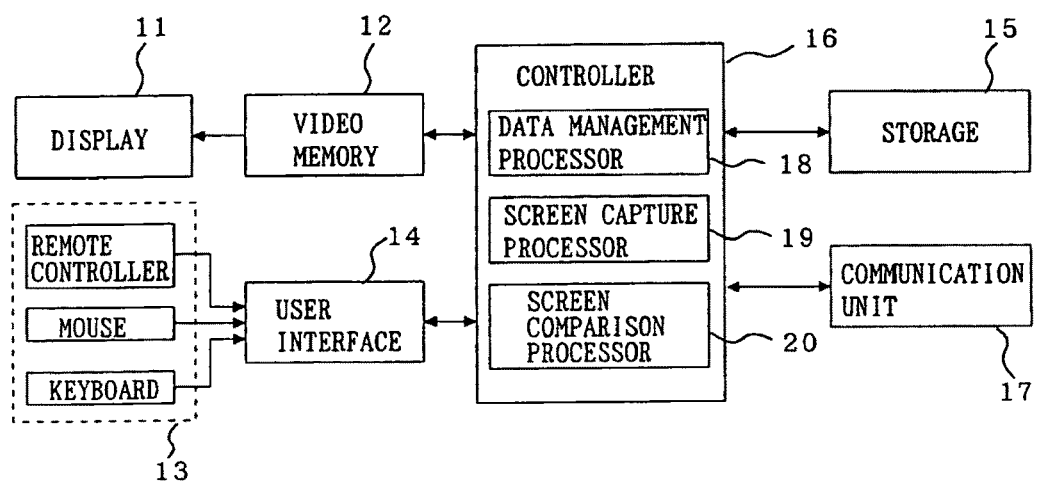
FIG. 26 is a block diagram illustrating a structure of the terminal in accordance with a second preferred embodiment of the present invention.

FIG. 26 is a block diagram illustrating the structure of the terminal 1 in accordance with a second preferred embodiment of the present invention.

The terminal 1 may be a personal computer or a PDA (Personal Digital Assistant). The terminal 1 includes a display 11 for presenting a diversity of information such as materials for presentation, a video memory 12 for storing the content to be presented on the display 11, an input section 13 including a tablet, a mouse, or a keyboard, a user interface 14 for detecting an operational input from the input section 13 and outputting the operational input to an arithmetic unit (CPU) 16, a storage 15 for storing application software programs (such as a control program) for performing the processes of the present invention, the arithmetic unit 16, and a communication unit 17.

The control program stored in the storage 15 is used to perform a terminal control function to achieve a multi-window screen presentation function on the network interactive display device 2, a screen capture function to capture a whole or a part of the screen of the display 11, an image conversion function to convert captured image data acquired by the screen capture function into data in a format of a display 21 of the network interactive display device 2, and a function to detect a change on the screen of the display 11. The application software programs and the CPU constitute a data management processor 18, a screen capture processor 19, and a screen comparison processor 20.

The data management processor 18 receives a variety of requests, including a connection request, a display request, an expansion display request, a request to switch to a single-window full screen, and an erase request through the user interface 14 or the communication unit 17, and performs processes responsive to each request. The data management processor 18 sends the captured image data, acquired by the image capture processor 19, to the display device 2 through the communication unit 17.

The communication unit 17 carries out a two-way communication with the network interactive display device 2. The communication protocol used here is the TCP/IP. The communication unit 17 has a protocol processing function for ARPICMP, IP, TCP, UDP, etc. required for the TCP/IP connection. This protocol processing function is carried out under the control of an OS.

Figure 27:
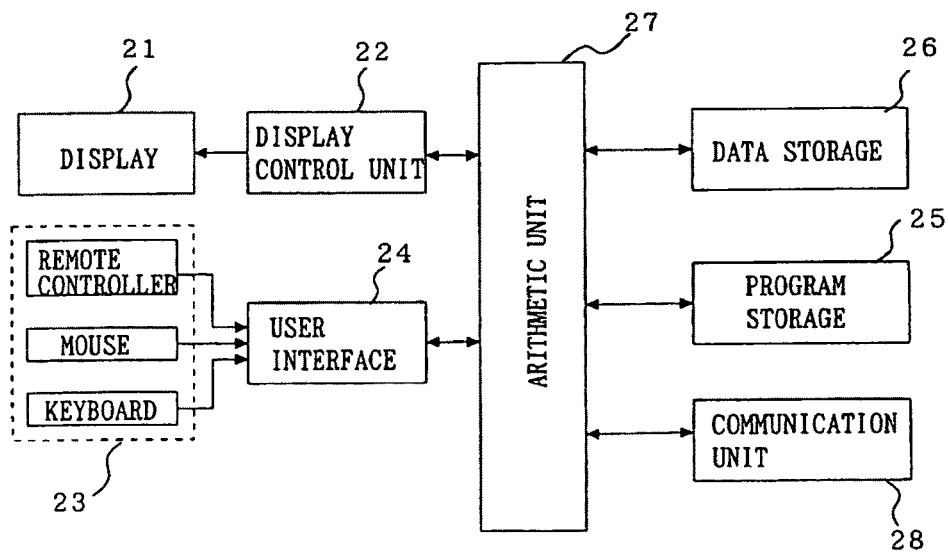
FIG. 27 is a block diagram illustrating a structure of the network interactive display device of the second preferred embodiment.

FIG. 27 is a block diagram illustrating the structure of the network interactive display device 2 of the second preferred embodiment.

The display device 2 includes the display 21, a display control unit 22 which has a multi-window screen presentation function, an expansion display function, a function to switch to the single-window full screen, an insertion function, and an erase function, and controls the display screen to be presented on the display 21, an input section 23 including a remote controller, a mouse, or a keyboard, a user interface 24 for detecting an operational input from the input section 23 and for outputting the operational input to an arithmetic unit 27 to be discussed later, a program storage 25 for storing the display control program to provide the multi-window screen presentation function of the present invention, a data storage 26 for storing a variety of files and data required to carry out a control program, the arithmetic unit (CPU) 27 for generally controlling the display device 2, and a communication unit 28 for performing a two-way communication with each terminal 1.

The communication unit 28 carries out a two-way communication with the terminal 1. The communication protocol used here is the TCP/IP. The communication unit 28 has a protocol processing function for ARPICMP, IP, TCP, UDP, etc. required for the TCP/IP connection.

The display device 2 may be a plasma display, or a liquid-crystal display instead of the projector shown in FIG. 1. The display 21 is different depending on the type of the display device 2. Specifically, the display 21 is one of a liquid-crystal light valve, an LCoS light valve, or a DMD (Digital Micromirror Device) (Trademark of Texas Instruments) in the projector. The display screen of the display 21 becomes a projecting screen. The display 21 is a plasma display panel in the plasma display device, a liquid-crystal panel in the liquid-crystal display device, or an organic EL (Electroluminescent) panel in the organic EL display device.

Figure 28:
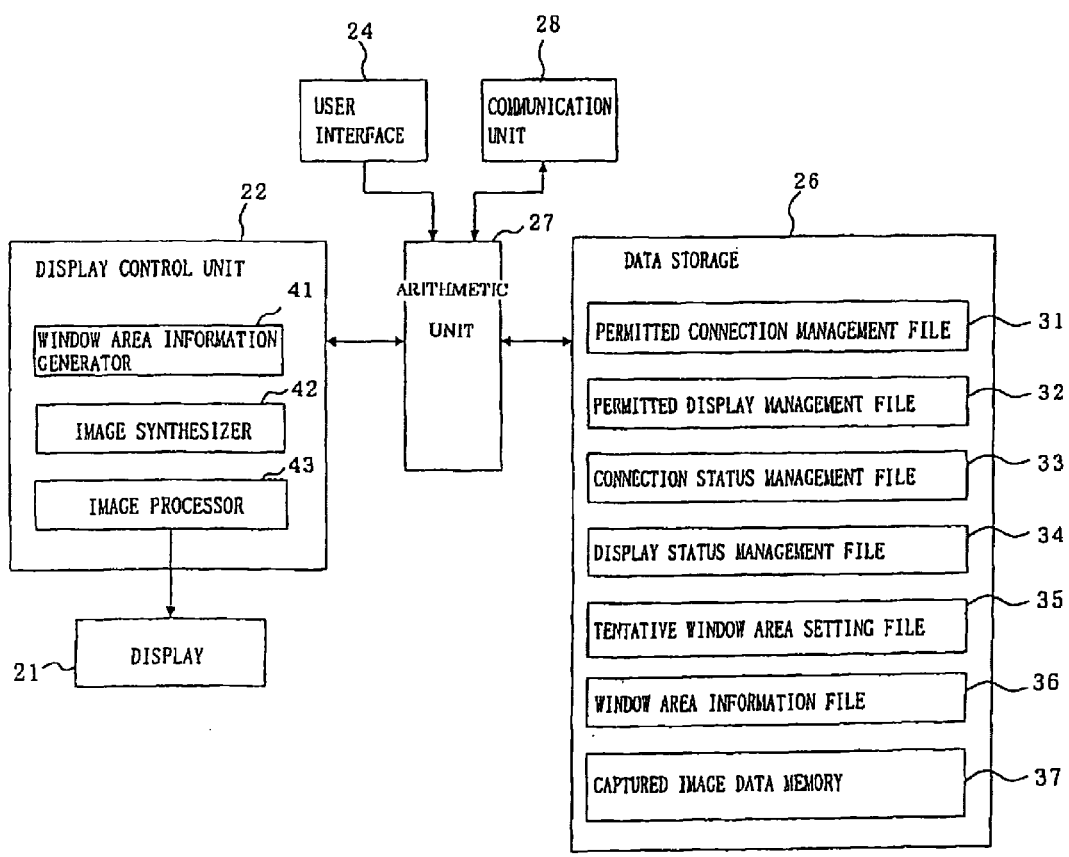
FIG. 28 is a functional diagram of an operation of the network interactive display device of the second preferred embodiment of the present invention.

Referring to FIG. 28, a variety of files stored in the data storage 26 are discussed.

The data storage 26 stores a permitted connection management file 31, a permitted display management file 32, a connection status management file 33, a display status management file 34, a tentative window area setting file 35, and a window area information file 36. The data storage 26 further includes a captured image data memory 37 for storing the captured image data sent from each terminal 1.

The permitted connection management file 31 registers a terminal name of a terminal 1 which is permitted for connection. The permitted display management file 32 registers a terminal name of a terminal 1 which is permitted for screen display.

The connection status management file 33 registers a terminal name of a terminal 1 which is currently connected to the display device 2.

The display status management file 34 manages a display status of the current display 21. The display status management file 34 manages, in a table form, terminal information relating to the terminal 1 that is a source of the captured image data currently presented on the display screen of the display 21. The display status management file 34 is updated each time the display screen of the display 21 is modified. For example, if the display screen is switched from a four-window screen to a three-window screen, terminal information of the terminal 1 corresponding to an erased window is deleted. If the display screen is switched from a four-window screen to a five-window screen, terminal information of the terminal 1 corresponding to an added window is newly registered.

FIG. 5 illustrates items of terminal information managed in the display status management file 34.

The display status management file 34 contains, as items thereof, a "terminal name", an "IP address", a "screen size", "color count information", "priority", a "capture area management flag", a "difference capture management flag", a "captured image size", a "difference captured image size 1", a "difference captured image size 2", a "difference capture origin 1", and a "difference capture origin 2".

The "terminal name" is a name provided beforehand to the terminal 1. The "screen size" is the number of pixels in the vertical and horizontal directions of the display screen of the display 11. For example, an SXGA terminal has 1280×1024 pixels, and an XGA terminal has 1024×768 pixels. The "color count information" represents the number of display colors of the display 11, and may be 256 colors, or 167,777,216 colors, for example. The terminal name, the IP address, the screen size, and the color count information are the items that must be stored in the display status management file 34 during a registration. Other items are set (updated) by the user as necessary.

The "priority" determines the size of the display size of each window assigned to the terminal 1 that is identified by the terminal name. The priority order takes "highest", "high" or "none". As will be discussed in detail, the display size having a high priority order becomes large. The "capture area management flag" manages the capture as to whether the screen of the terminal 1 identified by the terminal name is captured in a full-screen capture mode or a partial-screen capture mode. The capture area management flag is "0" in the full-screen capture mode, which is a standard mode, or "1" in the partial-screen capture mode.

The "difference capture management flag" manages the capture of whether the screen of the terminal 1 identified by the terminal name is captured in a normal capture mode or a change capture mode (hereinafter referenced to as a difference capture mode) for only a change on the display screen. The difference capture management file is "0" in the normal capture mode, or "1" in the difference capture mode.

The "captured image size" is the size of the captured image data (the number of pixels in the vertical and horizontal directions) when the capture area management flag is "1", i.e., in the partial-screen capture mode.

The "difference captured image size 1" and the "difference captured image size 2" represent the sizes of two different areas acquired in the difference capture when the difference capture management flag is "1". The "difference capture origin 1", and the "difference capture origin 2" are the origins of the two different areas acquired in the difference capture, and are the absolute coordinates within an area defined by the captured image size.

The tentative window area setting file 35 is a file in which information identifying a tentative window area assigned to the terminal 1 is set beforehand. The tentative window area setting file 35 contains a plurality of tables, each table prepared for the terminals. The table has a structure as shown in FIG. 11A and FIG. 16A. The table will be discussed later. The window area information file 36 will also be discussed later.

When a predetermined operation is performed on the input section 23, the display 21 displays the contents of the files 31, 32, 33, 34, 35, and 36. The user thus checks and modifies the data on the display screen at will.

Returning to FIG. 28, the display control unit 22 includes a window area information generator 41, an image synthesizer 42, and an image processor 43. The arithmetic unit 27 receives a variety of requests such as the connection request, the display request, the insertion display request, the erase request, etc., received through the user interface 24 or the communication unit 28. In response to these requests, under the control of the arithmetic unit 27, the processors 41, 42, and 43 respectively perform required processes while accessing necessary files in the data storage 26. The arithmetic unit 27 thus controls the display 21. A display control program, stored in the program storage 25, for providing a multi-window screen presentation function and the arithmetic unit (CPU) 27 constitute the display control unit 22.

From the display status management file 34, the window area information generator 41 learns the number of terminals 1 to be presented, and the priority order and the screen size of each terminal 1. The window area information generator 41 splits the display screen size of the display 21 in accordance with the number of terminals 1 to be presented, and the priority order and the screen size of each terminal 1. The window area information generator 41 generates the window area information containing display size (hereinafter referred to as a window area size) of the window on the display 21 assigned to each terminal 1 to be displayed, and information identifying the display position of the window (the absolute coordinates at the top left corner of the window with respect to the display screen, hereinafter also referred to as an origin). The information is stored in the data storage 26 as the window area information file 36.

The image synthesizer 42 performs various processes including a contraction process, an expansion process, and a color conversion process on the captured image data stored in the captured image data memory 37, and then synthesizes the captured image data in accordance with the window area information file 36 generated in the window area information generator 41.

The image processor 43 performs a scanning frequency conversion process on a variety of pieces of image data such as the synthesized image data generated in the image synthesizer 42, and the display status management file 34 of the data storage 26 which is referenced using an OSD (on-screen display) function, thereby generating display image data and outputting the display image data to the display 21. The image processor 43 includes a scan converter, for example.

Figure 29:
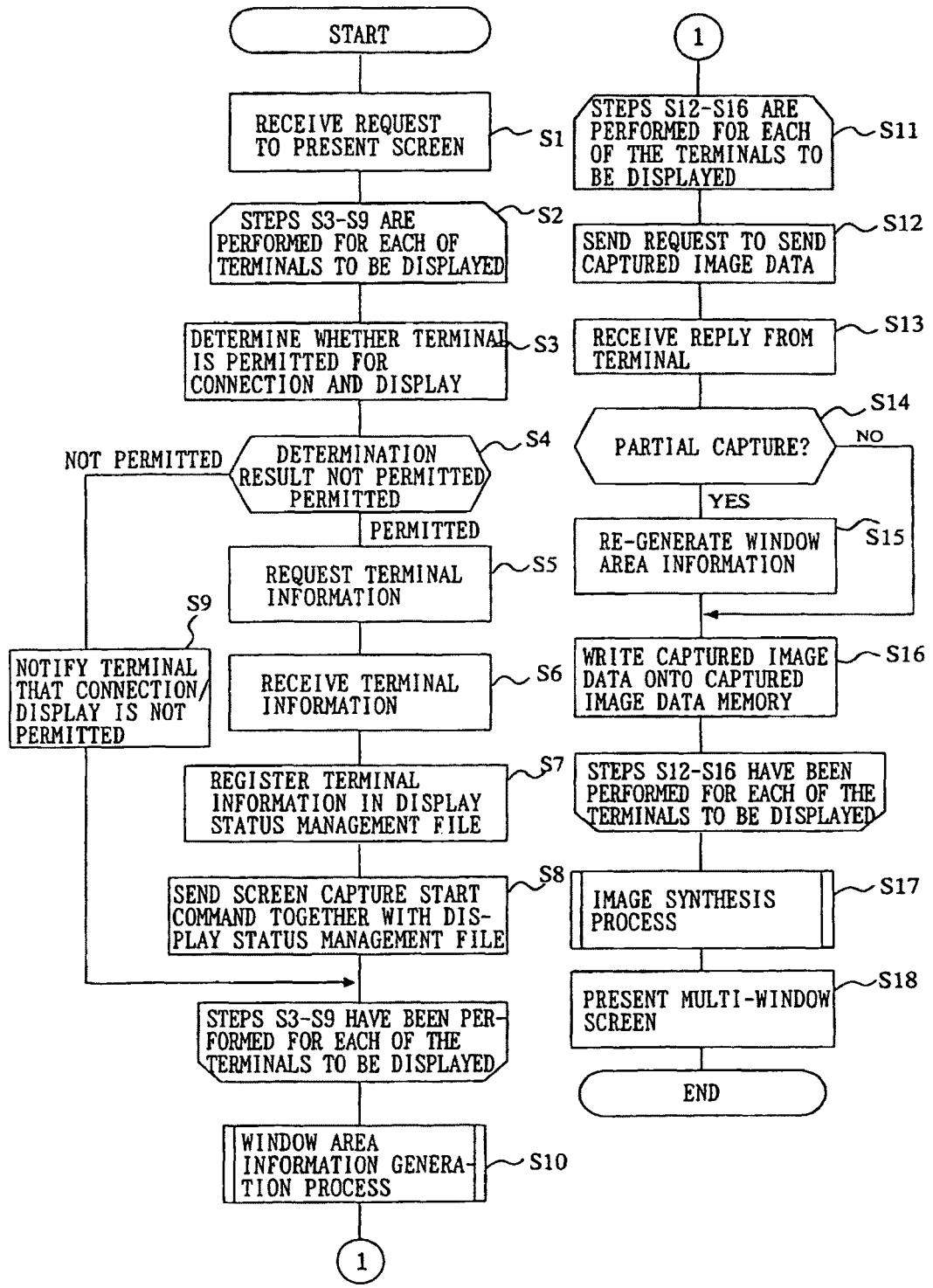
FIG. 29 is a flow diagram illustrating an operation of the display system of the second preferred embodiment of the present invention.

The operation of the second preferred embodiment of the present invention will now be discussed. FIG. 29 is a flow diagram illustrating the operation of the second preferred embodiment.

A predetermined operational input is entered in the input section 23 in the display device 2 in a preliminary step for multi-window screen presentation. Upon detecting the operational input through the user interface 24, the arithmetic unit 27 broadcasts a request to return a terminal name and an IP address together with the IP address of the display device 2 through the communication unit 28 and the network 3. When each terminal 1 receives the broadcast request to return the terminal name and the IP address, the terminal 1 returns own terminal name and IP address to the display device 2.

The display device 2 receives a reply (the terminal name and the IP address) from each terminal 1 through the communication unit 28, and determines whether each terminal is a connection permitted terminal. Specifically, the display device 2 determines whether the returned terminal name agrees with a terminal name registered in the permitted connection management file 31. If it is determined that the returned terminal name agrees with the registered terminal name, the display device 2 handles the terminal 1 as a connection permitted terminal.

The terminal names and the IP addresses of the terminals 1 determined as connection permitted terminals are successively registered in the connection status management file 33. The connection status management file 33 allows the display device 2 to learn how many terminals 1 are currently connected. Since the determination of whether the connection is permitted or not is based on the terminal name, the system works even if the IP address, provided to the terminal 1 using the DHCP, becomes different each time connection is made.

The display device 2 waits on standby for any request after the above preliminary step is complete. The display screens of the four terminals 1a-1d, out of the terminals 1 operated by conference participants, are presented on a multi-window display screen 50 of the display device 2. As for the resolutions thereof, the terminal 1a has an SXGA resolution (1280×1024 pixels), the terminal 1b has an SVGA resolution (800×600 pixels), the terminal 1c has an XGA resolution (1024×768 pixels), and the terminal 1d has a resolution of 480×640 pixels.

Multi-Window Screen Presentation Function

FIG. 8 illustrates the configuration of the display system in which display screens of four terminals 1a-1d are presented on the display screen of the display device 2.

The user operates the remote controller in the input section 23 to enter an operational input to display the screens of the terminals 1a-1d. Through the user interface 24, the arithmetic unit 27 is notified of the input information, namely, a request to display the screens of the terminals 1a-1d together with identification information of the terminals 1a-1d (step S1). When the request is placed, the priority order, the partial capture, and the difference capture may be designated. Here, no particular designation is performed.

Upon receiving the display request, the arithmetic unit 27 in the display device 2 performs processes in steps S3-S9 for each of the terminals 1a-1d to be displayed (step S2). The arithmetic unit 27 references the permitted connection management file 31 and the permitted display management file 32 according to the terminal name indicated by the identification information contained in the display request, thereby determining whether or not each terminal 1 is permitted for connection and whether or not each terminal 1 is permitted for display (step S3). If it is determined that each terminal 1 is permitted for both connection and display (step S4), the arithmetic unit 27 requests, through the communication unit 28, each terminal 1 to send the terminal information (the terminal name, the IP address, the screen size, and the color count information) (step S5). The arithmetic unit 27 receives the terminal information which has been sent in response to the request (step S6), and registers the terminal information in the display status management file (step S7). If the priority order, the partial capture, and the difference capture are designated during the placement of the display request, the priority order, the capture area management flag, and the difference capture management flag are also registered in the registration in step S7.

The arithmetic unit 27 sends the display status management file 34 and a screen capture start command to the terminal 1 which is permitted for connection and display (step S8). When any terminal 1 is not permitted for connection and display, the arithmetic unit 27 sends a notification to that effect to the terminal 1 (step S9).

If all four terminals 1a-1d are permitted for connection and display, the terminal information from the terminals 1a-1d is registered in the display status management file 34 in the processes in steps S2-S9. At the same time, the screen capture start command is sent together with the display status management file 34 to each of the terminals 1a-1d through the communication unit 28.

Subsequent to the above processes, the arithmetic unit 27 notifies the window area information generator 41 in the display control unit 22 of a window area split request. The display device 2 enters a window area information generation process (step S10). The operation of the terminal 1 having received the screen capture start command will be discussed later. Discussed first is the window area information generation process performed by the window area information generator 41 in response to the window area split request.

FIG. 9 is a flow diagram illustrating the flow of a window area information generation process. The operation of the window area information generator 41 is specifically discussed on the assumption that the display status management file 34 is constructed as shown in FIG. 10. As shown in FIG.

10, terminal names PC-1, PC-2, PC-3, and PDA-1 correspond to the terminals 1a, 1b, 1c, and 1d, respectively.

Upon receiving the window area split request from the arithmetic unit 27, the window area information generator 41 learns the number of the terminals 1 to be displayed (here, four terminals 1) referencing the display status management file 34. The user interface 14 also acquires the priority order of each of the terminals 1a-1d (step S21). The window area information generator 41 references the tentative window area setting file 35 according to the number of terminals 1 and the priority order of each of the terminals 1a-1d, and acquires a tentative size and a tentative origin of each tentative window area assigned to each of the terminals 1a, 1b, 1c, and 1d (step S22). As will be clarified later, the adjective "tentative" is used because the area window here assigned to the terminal 1 is updated in a later step to size convert the captured image data.

As shown in FIG. 10, the four terminals 1 are to be displayed here and no priority order is set to all of the four terminals 1. A tentative area setting table in the tentative window area setting file 35 is organized as shown in FIG. 11A. Here, the display screen of the display 21 has a resolution of 1280×1024 (SXGA), and the tentative area setting table shown in FIG. 11A is organized based on this display screen. FIG. 11B shows the tentative window area based on the table window area setting table shown in FIG. 11A.

The priority order shown in FIG. 11A is determined based on the "priority" item in the display status management file 34, and the terminals 1 are first, second, third, and fourth in from the high order to the low order. The terminals 1 are assigned the "tentative size" and the "tentative origin" for the tentative window area in the lower table. All the terminals 1a-1d have "none" in the priority order row with no priority order set therefor (see FIG. 10). If no priority order is set, the order of assignment may be a predetermined one, or may be the order of registration to the display status management file 34. In the second preferred embodiment, the terminals 1a, 1b, 1c, and 1d (hereinafter referred to as the terminal names PC-1, PC-2, PC-3, and PDA-1 as appropriate) are assigned tentative window areas 50A, 50B, 50C, and 50D in that order.

The window area information generator 41 further acquires the screen sizes of the PC-1, PC-2, PC-3, and PDA-1 from the display status management file 34 (see FIG. 10), and determines the sizes and origins of true windows respectively assigned thereto based on the acquired screen sizes (step S23).

FIG. 12 illustrates the true window area size and the true origin. As shown, 51A, 51B, 51C, and 51D represent the true window areas assigned to the PC-1, PC-2, PC-3, and PDA-1, respectively. The captured image data to be displayed on the tentative window area is size converted with the aspect ratio thereof maintained. The true window areas are display areas of the tentative window areas 50A, 50B, 50C, and 50D in which the converted images are respectively displayed with the centers thereof aligned to be centered on the respective tentative window areas. The PC-2 is now specifically discussed in connection with the true window area size to determine the true window area. The screen size of the PC-2 is 1024×768 pixels (see FIG. 10). The image data of this size is contracted with the aspect ratio thereof (namely, the aspect ratio of the display screen of the display 11) maintained so that the image data is displayed within the window area 50B having the size of 640×512 pixels assigned to the PC-2. The contracted size is thus the true window area size. The true origin is used to place the window of that size at the center of the window area 50B as shown in FIG. 12, and is represented in pixel coordinates at the top left corner of the window (the absolute coordinates with respect to the entire display screen).

The window area information generator 41 determines the above-referenced true window area sizes and true origins for the PC-1, PC-2, PC-3, and PDA-1, and generates window area information containing the terminal name item, the window area item, and the origin item as shown in FIG. 13, and then stores the window area information in the data storage 26 as the window area information file 36 (step S24). The window area information generation process thus ends. The window area information file 36 is tagged with processing date (May 21, 2002, 17:00:32, for example).

Returning to FIG. 29, the arithmetic unit 27 in the display device 2 performs processes in steps S12-S14 to each of the terminals 1a, 1b, 1c, and 1d to be displayed (step S11) when the window area information generator 41 completes the window area information generation process (step S10). More specifically, the arithmetic unit 27 places a request to send the captured image data (step S12). Each of the terminals 1a, 1b, 1c, and 1d has already started the image capture process after receiving the capture start command transmitted from the display device 2 in step S8. The captured image data acquired in the screen capture process and the image size (in the partial capture process) are sent to the display device 2 in response to the request to send the captured image data in step S11.

The display device 2 receives the reply from the terminal 1 (step S13). If the rely is the captured image data, the display device 2 determines that the screen capture performed by the terminal 1 is the full-screen capture (step S14), and the received captured image data is written onto the captured image data memory 37 (step S16).

If the reply from the terminal 1 received in step S13 contains the captured image data and the image size, the arithmetic unit 27 determines the screen capture performed by the terminal 1 is a partial-screen capture (step S14). The captured image size in the display status management file 34 is updated with the received image size. The arithmetic unit 27 regenerates the window area information (the true window area size and the true origin) based on the received image size (step S15). The arithmetic unit 27 writes the received captured image data together with the image size on the captured image data memory 37 (step S16).

The above process is performed for each of the terminals 1a-1d. When the captured image data is received from the terminals 1a-1d, the arithmetic unit 27 sends an image synthesis command to the image synthesizer 42. The display device 2 enters the image synthesis process (step S17).

Upon receiving the image synthesis command, the image synthesizer 42 performs the size conversion process and the color conversion process on the captured image data stored in the captured image data memory 37 based on the window area information in the window area information file 36 and the color count information in the display status management file 34. The image synthesizer 42 then the captured image data into a single screen image data, thereby generating the synthesized image data. The synthesized image data is then output to the image processor 43.

The image processor 43 converts the synthesized data from the image synthesizer 42 in display image data having a scanning frequency of the display 21. The display image data is then output to the display 21. As shown in FIG. 8, a multi-window display is thus present on the display screen 50 in which the captured image data (display screen) of the terminals 1a, 1b, 1c, and 1d is presented on the true window areas (hereinafter also referred to as window screens) of 51A, 51B, 51C, and 51D (step S18).

The operation of the terminal 1 having received the capture start command and the display status management file 34 from the display device 2 is discussed below.

Figure 30:
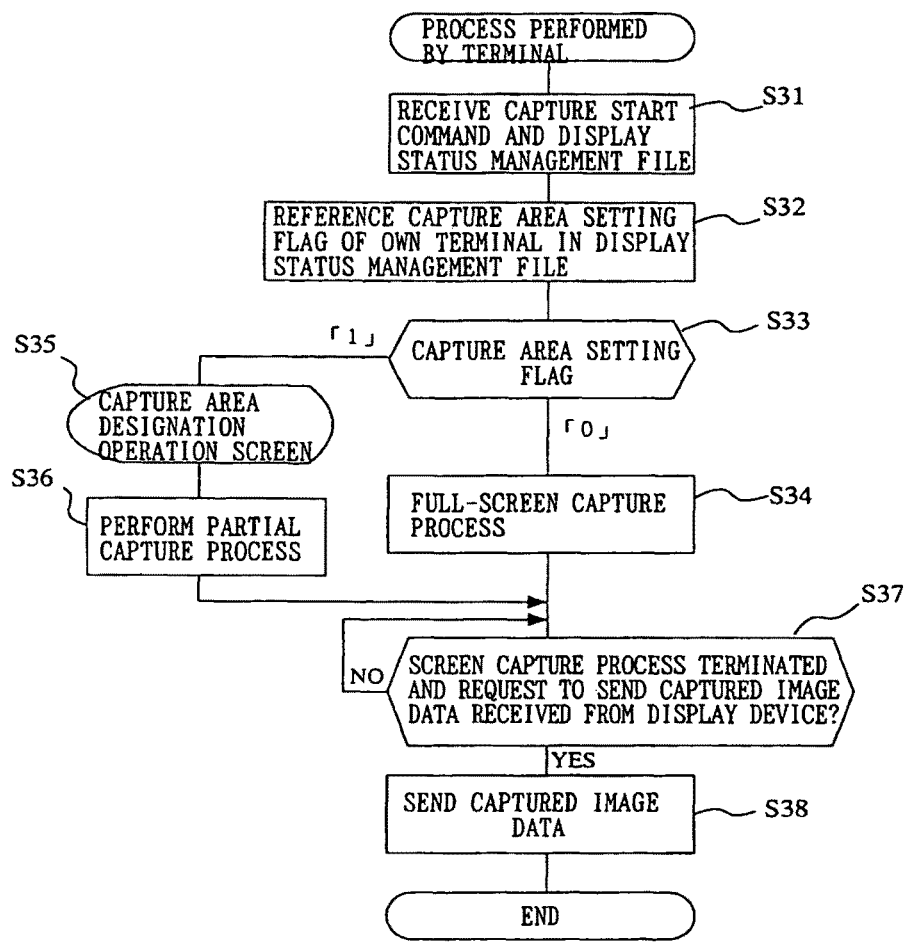
FIG. 30 is a flow diagram illustrating the operation of the terminal which has received a capture start command and a display status management file from the display device of the second preferred embodiment of the present invention.

FIG. 30 is a flow diagram of an operation of the terminal 1 which has received the capture start command and the display status management file 34 from the display device 2. The terminal 1 is here 1a (PC-1).

The data management processor 18 in the terminal 1a receives, through the communication unit 17, the capture start command and the display status management file 34 sent from the display device 2 (step S31). The data management processor 18 references the capture area setting flag in the terminal 1a in the display status management file 34 (step S32). Since the capture area setting flag is "0" (step S33), the full-screen capture is determined to be activated. The data management processor 18 sends a full-screen capture command to the screen capture processor 19. In response to the full-screen capture command, the screen capture processor 19 stores the content of the video memory 12 (i.e., the content currently displayed on the display screen of the display 11) in the storage 15 in a bit-map format (the full-screen capture process) (step S34). The image capture processor 19 notifies the data management processor 18 of the completion of the screen capture process.

If the capture area setting flag is "1" in step S33, a partial capture is determined to be activated. A capture area designation screen indicating a message saying "designate a capture area" is presented on the display 11 (step S35), and a partial capture command is sent to the screen capture processor 19. When the user, who reads the message on the capture area designation screen, selects a window or encloses a desired area using the input section 13, the screen capture processor 19 recognizes the user operation through the user interface 14. The image data on the video memory 12 corresponding to the designated area and the image size is stored in the storage 15 (the partial capture process) (step S36). The image capture processor 19 notifies the data management processor 18 of the completion of the screen capture process.

Upon receiving the capture start command, the terminal 1a performs the screen capture process. Meanwhile, the display device 2 performs the window area information generation process as already described. The terminal 1a sends the captured image data and the image size (in the partial capture) to the display device 2 through the communication unit 17 (step S38) after the screen capture processor 19 completes the screen capture process and the request to send the captured image data is received from the display device 2 (step S37).

The above-referenced process is similarly performed on each of the remaining terminals 1b, 1c, and 1d in addition to the terminal 1a. As a result, the display device 2 receives, from each of the terminals 1a, 1b, 1c, and 1d, the captured image data and the image size (in the partial capture process).

Each terminal 1 receives the display status management file 34 from the display device 2. The display status management file 34 is used to check the status of the capture area setting flag of own terminal 1. Furthermore, the content of the file may be displayed on the display 11 by performing a predetermined operation on the input section 13. The permitted connection management file 31, the permitted display management file 32, and the connection status management file 33 may also be acquired from the display device 2 as necessary to be presented on the display 11. In this way, the user may learn what terminals are displayed other than own terminal operated by the user himself and the range of authority granted to own terminal 1.

Expansion Display Function

The expansion display function for expanding any one of a plurality of currently presented windows is discussed below. The expansion display function is performed by updating the priority order in the above-referenced arrangement.

FIG. 15 diagrammatically illustrates the display system to explain the expansion display function. The screen of the terminal 1a is expanded by heightening the priority order of the terminal 1a.

The screen of the terminal 1a is designated by operating the remote controller. If the terminal 1a is assigned any key in the remote controller, the user designates the terminal 1a by pressing that key. If no particular key is assigned, the user may operate the remote controller to select the terminal 1a on a menu screen on the display 21, or may click the screen of the terminal 1a with a pointer on the display screen using the remote controller.

Designation information input in this way, i.e., the expansion display request containing the identification information of the terminal 1a, is sent to the arithmetic unit 27 through the user interface 24. The arithmetic unit 27 identifies the terminal 1a based on the identification information contained in the expansion display request. The arithmetic unit 27 sets the priority order of the terminal 1a (PC-1) in the display status management file 34 to be "highest", and sends a window area split request to the window area information generator 41.

The window area information generator 41 generates the window area information file 36 as already described. The tentative window area setting table, which is referenced in the generation of the window area information file 36, is organized as illustrated in FIG. 16A. FIG. 16B shows tentative window areas based on the tentative window area setting table. The priority order illustrated in FIG. 16B is determined based on the priority order in the display status management file 34. The priority order of the terminal 1a is higher than those of the remaining terminals 1b, 1c, and 1d. The terminal 1a is thus assigned the tentative window area 52A (the window area for the first terminal) having the first priority in FIG. 16B. The assignment of the window areas to the remaining terminals 1b, 1c, and 1d having no priority order set therefor is arbitrary. For example, the terminals 1b, 1c, and 1d are now assigned the window areas 52B, 52C, and 52D, respectively. As already described, the true window areas to be assigned to the terminals 1b, 1c, and 1d are determined.

FIG. 17 illustrates the true window areas. The terminals 1a, 1b, 1c, and 1d are assigned the true window areas 53A, 53B, 53C, and 53D, respectively. The window area information file 36 is then organized as illustrated in FIG. 18.

As already described, the captured image data (display screen) of the terminals 1b, 1c, and 1d appears on the true window areas 53A, 53B, 53C, and 53D, respectively. The designated window 53A is shown in the expanded state on the multi-window screen 50 as shown in FIG. 15.

Function to Switch to Single-Window Screen

One of the plurality of multi windows is shown on a single-window screen as shown in FIG. 19. The user operates the remote controller to enter an operational input for the function to switch to a single-window screen. More specifically, the arithmetic unit 27 is notified of the input information, namely, the single-window display request containing the identification information of the terminal 1c corresponding to the window 51C to be displayed on the single-window screen, through the user interface 24. The arithmetic unit 27 identifies the terminal 1c based on the identification information contained in the single-window display request. The arithmetic unit 27 sets the priority order item of the terminal 1c (PC-3) in the display status management file 34 to be the highest, thereby sending a window area split request to the window area information generator 41.

As a result, the multi-window screen is replaced with the single-window screen as shown in FIG. 19. The user may return to the multi-window screen by performing a predetermined operation on the remote controller to set the priority order to "none".

The switching to the single-window screen allows the user to recognize details, which are not visible in the contracted scale on the window. The ease of use is assured because the predetermined operation quickly returns the screen to the multi-window screen.

Insertion Function

As shown in FIG. 20, a new screen may be inserted into a currently presented multi-window screen. Such an insertion corresponds to a display request subsequent to the display of a multi-window screen. The screen insertion is thus performed in the same process as in the display request process.

Erase Function

As shown in FIG. 21, one of the plurality of currently presented windows may be erased. The user operates the remote controller to enter an operational input for the erase function. More specifically, the input information, namely, an erase request containing the identification information of the terminal 1d corresponding to the window 51D to be erased is sent to the arithmetic unit 27 through the user interface 24. The arithmetic unit 27 identifies the terminal 1d based on the identification information contained in the erase request. The arithmetic unit 27 deletes the terminal information of the terminal 1d from the display status management file 34, and sends a window area split request to the window area information generator 41. The subsequent process remains identical to the one already discussed. The window 50D designated for erasure is erased as shown in FIG. 21. The multi-window screen is reorganized so that a plurality of windows corresponding to the number of terminals subsequent to the erasure are presented. Alternatively, the window 51D designated for erasure may be merely erased.

In accordance with the second preferred embodiment, the screens respectively presented on the plurality of terminals 1 connected to the network 3 are presented on the display of the display device 2 having the multi-window screen presentation function.

Since the expansion display function, the switching function to the single-window screen, the insertion function, and the erase function are available in addition to the multi-window screen presentation function, a sophisticated display device 2 is provided.

The size conversion is performed with the aspect ratio of the captured image data maintained when a multi-window screen is presented. The display device 2 thus presents a display screen free from discordance.

Rather than updating the display screen each time the conference participant (the user) places the display request through the input section 23, the display device 2 itself updates the display screen thereof every three seconds, for example. In this case, the arithmetic unit 27 in the display device 2 controls timings, thereby performing subsequent processes as described above at regular intervals. The display screen of each terminal 1 is constantly updated.

Difference Capture Function

The full-screen capture method and the partial-screen capture method have been described. The display system 100 also provides a method in which a change in the display screen on the terminal 1 is detected and image data obtained by capturing the change only is sent.

The user operates the remote controller of the input section 23 to enter an operational input to perform a difference capture on each of the terminals 1a-1d. More specifically, the difference capture management flag in the display status management file 34 is set to be "1".

For a first cycle of process subsequent to the setting of the difference capture management flag to "1", steps S1-S18 are performed as described above to present the multi-window screen.

After the completion of the multi-window presentation, the arithmetic unit 27 in the display device 2 sends a difference capture start command together with the display status management file 34 to the terminal 1, having the difference capture management flag set to "1", through the communication unit 28 and the network 3.

The operation of the terminal 1 having received the difference capture start command and the display status management file 34 from the display device 2 will be discussed below.

FIG. 22 is a flow diagram illustrating the operation of terminal which has received the difference capture start command and the display status management file 34 from the display device 2. Here, the terminal is the terminal 1a (PC-1).

The data management processor 18 in the terminal 1a receives, through the communication unit 17, the difference capture start command and the display status management file 34 sent by the display device 2 (step S41). The terminal 1a thus performs a subsequent full-screen capture process. More specifically, the screen capture processor 19 stores the content of the video memory 12 in the storage 15 (step S42). The image data obtained here is referred to as pre-full-screen data.

The screen comparison processor 20 references the difference capture management flag in the display status management file 34, received by the data management processor 18, at any regular intervals set (once every 0.5 second, for example) (step S43). If the difference capture management flag is "1" (step S44), a subsequent difference capture operation is performed.

To quit the difference capture operation, the user simply sets the difference capture management flag to "0" in the same way the display status management file 34 is modified. The screen comparison processor 20 determines whether or not the capture operation is suspended, by referencing the difference capture management flag.

After performing the full-screen capture process, the screen capture processor 19 stores the content of the video memory 12 in the storage 15 (step S45). The image data obtained here is referred to as post-full-screen data. The screen comparison processor 20 in the controller 16 compares the pre-full-screen data with the post-full-screen data (step S46).

A screen comparison process is discussed in which a mouse pointer is moved (see FIG. 23). The mouse pointer changes the position thereof from pre-full-screen data 60 and post-full-screen data 61. As shown in FIG. 24, two areas 70 and 71 are recognized as being changed. The screen comparison processor 20 detects a change. If it is determined that there has been a change in the screen (step S47), the screen comparison processor 20 acquires image data of an area that has undergone a change, a size of the image data (the number of pixels in vertical and horizontal directions), and coordinates of an origin of the image data (absolute coordinates within the area defined by the captured image size in the display status management file 34).

In this case, the screen comparison processor 20 acquires, with respect to the area 70, captured image data of the area 70

(hereinafter referred to difference captured image data 1), a difference captured image size 1, and a difference capture origin 1, and with respect to the area 71, captured image data of the area 71 (hereinafter referred to difference captured image data 2), a difference captured image size 2, and a difference capture origin 2. The screen comparison processor 20 then stores these pieces of information in the storage 15 while notifying the data management processor 18 that the difference captured image data has been acquired (step S48). The difference captured image size 1, the difference captured image size 2, the difference capture origin 1, and the difference capture origin 2 are written on the respective portions thereof in the display status management file 34.

The data management processor 18 sends these pieces of data to the display device 2 through the communication unit 17 and the network 3 (step S49). The difference capture function is different from the full-screen capture and the partial-screen capture. More specifically, the difference capture function is performed not in response to the request to send received from the display device 2 but in response to the change in the screen detected by the screen comparison processor 20. The transmission operation of the captured image data is then performed.

The post-full-screen data is set to be pre-full-screen data for a subsequent screen comparison process (step S50).

The display device 2 then receives the difference captured image data 1, the difference captured image data 2, and the display status management file 34 from the terminal 1*a*. The operation of the display device 2 subsequent to the reception of these pieces of data will now be discussed.

Upon receiving the difference captured image data 1, the difference captured image data 2, and the display status management file 34 from the terminal 1*a* at the communication unit 28, the arithmetic unit 27 transfers an image synthesis command to the image synthesizer 42. The display device 2 enters the image synthesis process in the difference capture function.

Upon receiving the image synthesis command, the image synthesizer 42 rewrites portions of the captured image data stored in the captured image data memory 37 corresponding to the difference captured image data 1 and the difference captured image data 2, based on the window area information file 36 corresponding to the image displayed on the display 21 and the display status management file 34 (the difference captured image size 1, the difference captured image size 2, the difference capture origin 1, and the difference capture origin 2) received from the terminal 1*a*. The process subsequent to this operation are identical to those in steps S17 and S18.

The amount of image data transmitted over the network 3 is smaller in the difference capture process than in the full-screen capture (or the partial-screen capture) process. The workload on the network 3 is thus reduced. The user constantly monitors an updated image of the terminal 1.

The above description of the difference capture process is based on the assumption that a dedicated program installed on the terminal 1 is used to capture the screen. If a driver for directly detecting a difference in the content of the video memory is available on the operating system (OS), such a driver may be used.

The image data may be exchanged in a compression standard format (such as JPEG) between the terminal 1 and the display device 2 to reduce the workload on the network 3.

In the above description, a variety of requests such as the display request and the single-window screen presentation request is performed by operating the input section 23 on the display device 2. In other words, the display device 2 has the initiative in the organization of the screen. Alternatively, each terminal 1 may have the initiative. The conference participant (the user) enters a desired operational input by operating the input section 13 on own terminal 1. The input information is transferred to the data management processor 18 through the user interface 14. The data management processor 18 in turn sends the request, including the terminal name and the IP address of own terminal 1, responsive to the input information to the display device 2 via the communication unit 17 and the network 3. The request is received by the communication unit 28 in the display device 2 through the network 3. The request is then transferred to the arithmetic unit 27. The operation subsequent thereto remains the same as those already discussed. In this way, a variety of requests may be placed on the terminal 1.

The terminal 1 may designate the capture area by containing information, which designates the full-screen capture or the partial-screen capture, in the variety of requests.

The priority order may be designated by the user as necessary as described above. Alternatively, a plurality of terminals 1 which are scheduled to be connected to the display device 2 may be assigned beforehand priority order. If the terminals 1 are assigned beforehand the priority order, the priority assigned to each terminal 1 is automatically set in the priority item of the display status management file 34 when the terminal information is registered in the display status management file 34.

In the second preferred embodiment, the tentative window area is determined based on the tentative window area setting file 35. Alternatively, the tentative window area may be determined through calculation each time.

What is claimed is:

1. A display method of a projector connected to a plurality of terminals via a network to project image data transmitted from all of the plurality of terminals connected to the projector in a multi-window screen, comprising:
    assigning one of a plurality of window areas to each of the image data transmitted from each of the terminals;
    assigning, to each of the plurality of window areas, respective images which each have been converted in a display size of the corresponding image data transmitted from each of the terminals; and
    after an image is inserted or erased, in the multi-window screen, displaying all the images in the multi-window screen without overlapping each other, the plurality of window areas are sized based on priority order for each terminal of the plurality of terminals;
    when no priority order is set to all of the plurality of terminals and screen sizes of the plurality of terminals are the same, the plurality of window areas are automatically divided equivalently.

2. The display method of claim 1, wherein a specific window in the multi-window screen can be expanded by a predetermined operation of a remote controller to the projector.

3. The display method of claim 1, wherein the multi-window screen can be switched to a single window screen only for a specific window in the multi-window screen by a predetermined operation of a remote controller to the projector.

4. The display method of claim 3, wherein the single window screen can be returned to the multi-window screen by a predetermined operation of a remote controller to the projector.

5. The display method of claim 1, wherein a new window can be inserted into the multi-window screen by a predetermined operation of a remote controller to the projector.

6. The display method of claim 1, wherein a specific window in the multi-window screen can be erased by a predetermined operation of a remote controller to the projector.

7. The display method of claim 6, wherein the multi-window screen is reorganized into a plurality of windows according to the number of windows after erasing the specific window, and is displayed.

8. The display method of claim 6, wherein the multi-window screen after erasing the specific window is displayed, without reorganizing the screen.

9. A projector connected to a plurality of terminals via a network to project image data transmitted from all of the plurality of terminals connected to the projector in a multi-window screen, wherein:
one of a plurality of window areas is assigned to each of the image data transmitted from each of the terminals;
images which each have been converted in a display size of the corresponding image data transmitted from each of the terminals are assigned to the respective window areas;
after an image is inserted or erased, in the multi-window screen, all the images are displayed in the multi-window screen without overlapping each other, the plurality of window areas are sized based on priority order for each terminal of the plurality of terminals;
when no priority order is set to all of the plurality of terminals and screen sizes of the plurality of terminals are the same, the plurality of window areas are automatically divided equivalently.

10. The projector of claim 9, wherein a specific window in the multi-window screen can be expanded by a predetermined operation of a remote controller to the projector.

11. The projector of claim 9, wherein the multi-window screen can be switched to a single window screen only for a specific window in the multi-window screen by a predetermined operation of a remote controller to the projector.

12. The display method of claim 11, wherein the single window screen can be returned to the multi-window screen by a predetermined operation of a remote controller to the projector.

13. The projector of claim 9, wherein a new window can be inserted into the multi-window screen by a predetermined operation of a remote controller to the projector.

14. The projector of claim 9, wherein a specific window in the multi-window screen can be erased by a predetermined operation of a remote controller to the projector.

15. The projector of claim 14, wherein the multi-window screen is reorganized into a plurality of windows according to the number of windows after erasing the specific window, and is displayed.

16. The projector of claim 14, wherein the multi-window screen after erasing the specific window is displayed, without reorganizing the screen.

17. The display method of claim 1, wherein:
the conversion of each display size of the images has been performed while maintaining an aspect ratio of the corresponding image data before the conversion.

18. The projector of claim 9, wherein:
the conversion of each display size of the images has been performed while maintaining an aspect ratio of the corresponding image data before the conversion.

19. An image display apparatus connected to a plurality of terminals via a network to project image data transmitted from each of the terminals in a multi-window screen, wherein:
one of a plurality of window areas is assigned to each of the image data transmitted from each of the terminals;
images which each have been converted in a display size of the corresponding image data transmitted from each of the terminals are assigned to the respective window areas; and
after an image is inserted or erased, in the multi-window screen, all the images are displayed in the multi-window screen without overlapping each other, the plurality of window areas are sized based on priority order for each terminal of the plurality of terminals; and
when no priority order is set to all of the plurality of terminals and screen sizes of the plurality of terminals are the same, the plurality of window areas are automatically divided equivalently.

20. The image display apparatus of claim 19, wherein:
the conversion of each display size of the images is performed while maintaining an aspect ratio of the corresponding image data before the conversion.

* * * * *